United States Patent
Naniwa et al.

(10) Patent No.: US 6,588,339 B2
(45) Date of Patent: Jul. 8, 2003

(54) PLATE-MAKING METHOD, PLATE-MAKING APPARATUS, COMPUTER-TO-CYLINDER TYPE LITHOGRAPHIC PRINTING PROCESS AND COMPUTER-TO-CYLINDER TYPE LITHOGRAPHIC PRINTING APPARATUS

(75) Inventors: Mutsumi Naniwa, Shizuoka (JP); Yusuke Nakazawa, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/883,335

(22) Filed: Jun. 19, 2001

(65) Prior Publication Data

US 2002/0038611 A1 Apr. 4, 2002

(30) Foreign Application Priority Data

Jun. 19, 2000 (JP) ........................................ 2000-183141
Jul. 12, 2000 (JP) ........................................ 2000-211412

(51) Int. Cl.$^7$ ............................. B41C 1/10; B41J 2/165; B41J 2/18
(52) U.S. Cl. ........................... 101/465; 347/22; 347/28; 347/36
(58) Field of Search ................ 101/463.1, 465, 101/466, 467; 347/22, 23, 28, 35, 36, 102, 55

(56) References Cited

U.S. PATENT DOCUMENTS

| | | | | |
|---|---|---|---|---|
| 4,987,429 A | * | 1/1991 | Finley et al. | 347/28 |
| 5,495,272 A | * | 2/1996 | Yamaguchi | 347/28 |
| 6,092,891 A | * | 7/2000 | Okubo et al. | 347/104 |
| 6,145,954 A | * | 11/2000 | Moore | 347/28 |
| 6,273,103 B1 | * | 8/2001 | Enz et al. | 347/28 |
| 6,513,910 B2 | * | 2/2003 | Naniwa et al. | 347/55 |

FOREIGN PATENT DOCUMENTS

| | | | |
|---|---|---|---|
| EP | 988968 | * | 3/2000 |
| JP | A-64-27953 | | 1/1989 |
| JP | A-4-97848 | | 3/1992 |

* cited by examiner

*Primary Examiner*—Stephen R. Funk
(74) *Attorney, Agent, or Firm*—Sughrue Mion, PLLC

(57) ABSTRACT

A plate-making method comprising: forming an image directly on a plate material by an electrostatic ink jet method comprising ejecting an oil ink using electrostatic field based on signals of image data; and fixing said image to manufacture a printing plate, wherein said method uses: (1) an ink circulation line having the following members a, b and c: a. an ink jet ejection head, b. an ink transportation line comprising an ink feed line for feeding said oil ink to said ink jet ejection head and an ink recovery line for recovering said oil ink from said ink jet ejection head, and c. an ink tank for storing said oil ink; (2) a cleaning solution feed line for feeding a cleaning solution to said ink transportation line; and (3) a cleaning solution recovery line for recovering said cleaning solution from said ink transportation line, and wherein at the time of cleaning, said ink tank is separated from said ink transportation line, said cleaning solution feed line and said cleaning solution recovery line are connected to said ink transportation line, and a cleaning solution is transported to the ink transportation line to perform the cleaning.

43 Claims, 13 Drawing Sheets

ND COMPUTER-TO-CYLINDER TYPE
LITHOGRAPHIC PRINTING APPARATUS

FIELD OF THE INVENTION

The present invention relates to a plate-making method and a plate-making apparatus, which perform digital plate-making, and also relates to a computer-to-cylinder type lithographic printing process and a computer-to-cylinder type lithographic printing apparatus, which perform the digital plate-making on a press and subsequently perform printing. More specifically, the present invention relates to a plate-making method, a plate-making apparatus, a computer-to-cylinder type lithographic printing process and a computer-to-cylinder type lithographic printing apparatus, where the ink transportation line in an ink jet method of ejecting an oil in using electrostatic field has a cleaning function and thereby, good image quality can be attained in the plate-making and in the printing.

BACKGROUND OF THE INVENTION

In the lithographic printing, the printing is performed by forming a printing ink-receptive region and a printing ink-repulsive region on the surface of a printing plate in correspondence to an image original and adhering a printing ink to the ink-receptive region. Usually, hydrophilic and lipophilic (ink-receptive) regions are imagewise formed on the surface of a printing plate and the hydrophilic region is rendered ink-repulsive using a fountain solution.

In general, the recording of an image on a printing original plate (plate-making) is performed by a method of once outputting an image original on a silver salt photographic film in an analog or digital manner, exposing a diazo resin or photopolymerizable photopolymer light-sensitive material (printing original plate) through the film and then, dissolving and removing the non-image area using an alkaline developer.

In recent years, the lithographic printing process is demanded to meet requirements for more improvement in the digital drawing technique and higher efficiency in the process thereof and for satisfying these requirements, a large number of systems for directly drawing digital image information on a printing original plate have been proposed. These techniques are called CTP (computer-to-plate) or DDPP (digital direct printing plate). With respect to the plate-making method, for example, a system of recording an image in the light or heat mode using a laser has been proposed and this system is partially put into practical use.

However, in this plate-making method, irrespective of light mode or heat mode, the plate-making generally involves a treatment with an alkaline developer after the laser recording to dissolve and remove the non-image area and therefore, an alkaline waste solution is discharged. This is not preferred in view of the environmental conservation.

As means for realizing an efficient printing process, a system of performing the image drawing on a press is known. In the above-described method of using a laser, an expensive and large-scale apparatus is necessary. In this respect, a system applying an ink let method which is an inexpensive and compact recording device, has been proposed.

JP-A-4-97848 (the term "JP-A" as used herein means an "unexamined published Japanese patent application") discloses a method of providing a plate drum having a hydrophilic or lipophilic surface part in place of the conventional plate cylinder, forming thereon a lipophilic or hydrophilic image by an ink jet method, removing and cleaning the image after the completion of printing. In this method, however, it is difficult to attain easy removing (namely, cleaning) of the printed image and a sufficiently long press life at the same time. In the case of forming an image having a high press life on a plate cylinder, an ink containing a resin in a relatively high concentration must be used and accompanying the evaporation of solvent at the nozzle part, the resin readily fixes to the ink jet means of forming a printing image, as a result, the ink ejection stability decreases and a good image cannot be obtained.

JP-A-64-27953 discloses a method of drawing an image on a hydrophilic plate material by an ink jet method using a lipophilic wax ink, thereby performing plate-making. In this method, the image is formed by a wax and therefore, the image area is weak in the mechanical strength and deficient in the adhesive property to the hydrophilic surface of the plate material, which gives rise to poor press life.

A plate-making method and a plate-making apparatus using an ink jet method of ejecting an oil ink using an electrostatic field are recently attracting attention. In this ink jet method, however, it has been found that the adhesion of dust and fixing of ink to the ejection electrode deteriorate the ejection performance and also, the ink fixing on the passage of the ink circulation line decreases the ink flow rate to cause deterioration in the ejection performance.

The problem to be solved in the present invention is to provide a method of removing attachments to the ejection electrode and on the passage of ink circulation line.

The present invention has been made by taking account of the above-described problems.

SUMMARY OF THE INVENTION

A first object of the present invention is to provide a plate-making method, a plate-making apparatus, a computer-to-cylinder type lithographic printing process and a computer-to-cylinder type lithographic printing apparatus, which can adopt the digital technique not requiring a development processing.

A second object of the present invention is to provide a plate-making method, a plate-making apparatus, a computer-to-cylinder type lithographic printing process and a computer-to-cylinder type lithographic printing apparatus, where a lithographic printing plate capable of creating a large number of clear and high-quality printed matters can be manufactured inexpensively by a simple and easy method.

A third object of the present invention is to provide a plate-making method, a plate-making apparatus, a computer-to-cylinder type lithographic printing process and a computer-to-cylinder type lithographic printing apparatus, where attachments to the ejection electrode and on the passage of the ink circulation line can be removed.

Other objects and effects of the present invention will become apparent from the following description.

The above-described objects of the present invention have been achieved by providing the followings.

1) A plate-making method comprising:
   forming an image directly on a plate material by an electrostatic ink jet method comprising ejecting an oil ink using electrostatic field based on signals of image data; and fixing said image to manufacture a printing plate,
wherein said method uses:
(1) an ink circulation line having the following members a, b and c:
   a. an ink jet ejection head,
   b. an ink transportation line comprising an ink feed line for feeding said oil ink to said ink jet ejection head and an ink recovery line for recovering said oil ink from said ink jet ejection head, and
   c. an ink tank for storing said oil ink;
(2) a cleaning solution feed line for feeding a cleaning solution to said ink transportation line; and
(3) a cleaning solution recovery line for recovering said cleaning solution from said ink transportation line, and
   wherein at the time of cleaning, said ink tank is separated from said ink transportation line, said cleaning solution feed line and said cleaning solution recovery line are connected to said ink transportation line, and a cleaning solution is transported to the ink transportation line to perform the cleaning.

2) The plate-making process according to item 1) above, wherein said cleaning solution is circulated at the time of cleaning.

3) The plate-making method according to item 1) or 2) above, wherein the flow rate of said cleaning solution at the time of cleaning is higher than the flow rate of ink at the time of drawing an image.

4) The plate-making method according to any one of items 1 to 3 above, wherein said oil ink comprises:
   a nonaqueous solvent having an electric resistivity of $10^9$ Ωcm or more and a dielectric constant of 3.5 or less; and
   resin particles dispersed in said nonaqueous solvent, said resin particles being solid and hydrophobic at least at an ordinary temperature.

5) A plate-making apparatus comprising:
an image-forming unit which forms an image directly on a plate material; and
an image-fixing unit which fixes the image formed by said image-forming unit to obtain a printing plate,
wherein said image-forming unit comprises:
   an ink jet drawing device having an ink jet ejection head from which an oil ink is ejected using electrostatic field based on signals of image data,
   an ink circulation unit comprising:
   (1) said ink jet ejection head,
   (2) an ink transportation unit comprising an ink feed member which feeds said oil ink to said ink jet ejection head and an ink recovery member which recovers said oil ink from said ink jet ejection head, and
   (3) an ink tank for storing said oil ink,
      a cleaning solution feed member which feeds a cleaning solution to said ink transportation unit,
      a cleaning solution recovery member which recovers said cleaning solution from said ink transportation unit,
      a feed side changeover member which separates said ink tank from said ink transportation unit and at the same time, connects said cleaning solution feed member to said ink transportation unit, and
      a recovery side changeover member which connects said cleaning solution recovery member to said ink transportation unit.

6) The plate-making apparatus according to item 5) above, further comprising a circulation unit which circulates said cleaning solution at the time of cleaning.

7) The plate-making apparatus according to item 5) or 6) above, further comprising a flow rate-changing member capable of increasing the flow rate of said cleaning solution at the time of cleaning higher than the flow rate of ink at the time of drawing an image.

8) The plate-making apparatus according to any one of items 5) to 7) above, wherein said oil ink comprises:
   a nonaqueous solvent having an electric resistivity of $10^9$ Ωm or more and a dielectric constant of 3.5 or less; and
   resin particles dispersed in said nonaqueous solvent, said resin particles being solid and hydrophobic at least at an ordinary temperature.

9) The plate-making apparatus according to any one of items 5) to 8) above, wherein said image-fixing unit has a heating member comprising at least one of a heat roller and a lamp selected from an infrared lamp, a halogen lamp and a xenon flash lamp.

10) The plate-making apparatus according to item 9) above, wherein said heating member is disposed or controlled to gradually elevate the temperature of said plate material at the time of fixing said image.

11) The plate-making apparatus according to any one of items 5) to 8) above, further comprising a drum which is rotatable and capable of mounting said plate material thereon, so that the drawing of an image can be performed while moving said plate material by the rotation of said drum.

12) The plate-making apparatus according to item 11) above, wherein said ejection head comprises a single channel head or a multi-channel head and is movable in a direction parallel to an axis of said drum to perform sub-scanning.

13) The plate-making apparatus according to any one of items 5) to 10) above, further comprising at least one pair of capstan rollers capable of holding and running said plate material to perform sub-scanning.

14) The plate-making apparatus according to item 13) above, wherein said ejection head comprises a single channel head or a multi-channel head and is movable in a direction orthogonal to the running direction of said plate material to perform main scanning.

15) The plate-making apparatus according to item 11) or 13) above, wherein said ejection head comprises a full line head having almost the same length as the width of said plate material.

16) The plate-making apparatus according to any one of items 5) to 15) above, which comprises a dust-removing member which removes dusts present on the surface of said plate material at least one of before and during the drawing on said plate material.

17) The plate-making apparatus according to any one of items 5) to 16) above, wherein said ink jet drawing device has a stirring member which stirs the oil ink in said ink tank for storing said oil ink.

18) The plate-making apparatus according to any one of items 5) to 17) above, wherein said ink jet drawing device has an ink temperature-controlling member which controls the temperature of said oil ink in said ink tank for storing said oil ink.

19) The plate-making apparatus according to any one of items 5) to 18) above, wherein said ink jet drawing device has an ink concentration-controlling member which controls the concentration of said oil ink.

20) The plate-making apparatus according to any one of items 5) to 19) above, which comprises a cleaning member which cleans said ejection head.

21) A computer-to-cylinder lithographic ink jet printing process comprising:

mounting a plate material onto a plate cylinder;

forming an image directly on said plate material by an ink jet method comprising ejecting an oil ink using the electrostatic field based on signals of image data to manufacture a printing plate; and performing lithographic printing using said printing plate, wherein said process uses:
(1) an ink circulation line having the following members a, b and c:
  a. an ink jet ejection head,
  b. an ink transportation line comprising an ink feed line for feeding said oil ink to said ink jet ejection head and an ink recovery line for recovering said oil ink from said ink jet ejection head, and
  c. an ink tank for storing said oil ink;
(2) a cleaning solution feed line for feeding a cleaning solution to said ink transportation line; and
(3) a cleaning solution recovery line for recovering said cleaning solution from said ink transportation line, and
  wherein at the time of cleaning, said ink tank is separated from said ink transportation line, said cleaning solution feed line and said cleaning solution recovery line are connected to said ink transportation line, and a cleaning solution is transported to the ink transportation line to perform the cleaning.

22) The computer-to-cylinder lithographic ink jet printing process according to item 21) above, wherein said cleaning solution is circulated at the time of cleaning.

23) The computer-to-cylinder lithographic ink jet printing process according to item 21) or 22) above, wherein the flow rate of said cleaning solution at the time of cleaning is higher than the flow rate of ink at the time of drawing an image.

24) The computer-to-cylinder type lithographic ink jet printing process according to any one of items 21) to 23) above, wherein said oil ink comprises:

a nonaqueous solvent having an electric resistivity of $10^9$ Ωcm or more and a dielectric constant of 3.5 or less; and resin particles dispersed in said nonaqueous solvent, said resin particles being solid and hydrophobic at least at an ordinary temperature.

25) A computer-to-cylinder lithographic printing apparatus comprising:

a plate cylinder for mounting a plate material thereon;

an image-forming unit which forms an image directly on the plate material on said plate cylinder to manufacture a printing plate having formed thereon an image; and a lithographic printing unit which performs lithographic printing using said printing plate, wherein said image-forming unit comprises:
an ink jet drawing device having an ink jet ejection head from which an oil ink is ejected using electrostatic field based on signals of image data,
an ink circulation unit comprising:
(1) said ink jet ejection head,
(2) an ink transportation unit comprising an ink feed member which feeds said oil ink to said ink jet ejection head and an ink recovery member which recovers said oil ink from said ink jet ejection head, and
(3) an ink tank for storing said oil ink,
  a cleaning solution feed member which feeds a cleaning solution to said ink transportation unit,
  a cleaning solution recovery member which recovers said cleaning solution from said ink transportation unit,
  a feed side changeover member which separates said ink tank from said ink transportation unit and at the same time, connects said cleaning solution feed member to said ink transportation unit, and
  a recovery side changeover member which connects said cleaning solution recovery member to said ink transportation unit.

26) The computer-to-cylinder lithographic printing apparatus according to item 25) above, which comprises a circulation unit which circulates said cleaning solution at the time of cleaning.

27) The computer-to-cylinder lithographic printing apparatus according to item 25) or 26) above, which comprises a flow rate-changing member capable of increasing the flow rate of said cleaning solution at the time of cleaning higher than the flow rate of ink at the time of drawing an image.

28) The computer-to-cylinder lithographic printing apparatus according to any one of items 25) to 27) above, wherein said oil ink comprises:

a nonaqueous solvent having an electric resistivity of $10^9$ Ωcm or more and a dielectric constant of 3.5 or less; and resin particles dispersed in said nonaqueous solvent, said resin particles being solid and hydrophobic at least at an ordinary temperature.

29) The computer-to-cylinder lithographic printing apparatus according to any one of items 25) to 28) above, wherein said image-forming unit has a fixing device for fixing said ink.

30) The computer-to-cylinder lithographic printing apparatus according to any one of items 25) to 29) above, wherein said image-forming unit has a plate material surface dust-removing member which removes dusts present on the surface of plate material at least one of before and during the drawing on said plate material.

31) The computer-to-cylinder lithographic printing apparatus according to any one of items 25) to 30) above, wherein said plate cylinder is rotatable so that the drawing of an image can be performed while moving said plate material by the rotation of said plate cylinder.

32) The computer-to-cylinder lithographic printing apparatus according to item 31) above, wherein said ejection head comprises a single channel head or a multi-channel head and is movable in a direction parallel to an axis of said plate cylinder to perform sub-scanning.

33) The computer-to-cylinder lithographic printing apparatus according to item 31) above, wherein said ejection head comprises a full line head having almost the same length as the width of said plate cylinder.

34) The computer-to-cylinder lithographic printing apparatus according to any one of items 25) to 33) above, which further comprises an ink-stirring member in said ink tank.

35) The computer-to-cylinder lithographic printing apparatus according to any one of items 25) to 34) above, which further comprises an ink temperature-controlling member which controls the temperature of the oil ink in said ink tank.

36) The computer-to-cylinder lithographic printing apparatus according to any one of items 25) to 35) above, which further comprises an ink concentration-controlling member which controls the concentration of said ink.

37) The computer-to-cylinder lithographic printing apparatus according to any one of items 25) to 36) above, wherein said ink jet drawing device has an ejection head-retreating or approximating member which approximates said ejection head to said plate cylinder at the drawing on said plate material and retreats said ejection head from said plate cylinder except for the drawing on said plate material.

38) The computer-to-cylinder lithographic printing apparatus according to any one of items 25) to 37) above, wherein said image-forming unit has an ejection head-cleaning member which cleans said ejection head at least at the completion of plate-making.

39) The computer-to-cylinder lithographic printing apparatus according to any one of items 25) to 38) above, wherein said lithographic printing unit has a paper dust-removing member which removes paper dusts generated at the lithographic printing.

As such, in the plate-making apparatus or computer-to-cylinder type lithographic printing apparatus by an ink jet method of ejecting an oil ink using electrostatic field, the ink circulation line is changed over to a cleaning solution at the time of cleaning the ink passage, whereby attachments to the electrode and on the passage of the circulation line can be removed.

DETAILED DESCRIPTION OF THE INVENTION

The present invention is described in detail below.

In the present invention, the objective is a method of forming an image on a plate material (printing original plate) by an ink jet method of ejecting an oil ink from the ejection head using electrostatic field.

The ink jet method for use in the present invention is described, for example, in PCT Publication WO93/11866. In this ink jet method, an ink having high resistance obtained by dispersing at least resin particles, which are solid and hydrophobic at ordinary temperatures, in an insulating solvent is used, a strong electric field is allowed to act on this ink at the ejection position to form an aggregate of resin particles at the ejection position, and the aggregate is ejected from the ejection position using electrostatic means. In this way, the resin particles are ejected as an aggregate formed to a high concentration and therefore, the printed dots can have a sufficiently large thickness, as a result, the image of aggregated resin particles formed on the printing plate as a recording medium can have sufficiently long press life In this ink jet method, the size of the ink droplet ejected is determined by the size of the distal end of the ejection electrode or the conditions in forming the electric field. Therefore, a small ink droplet can be obtained without reducing the ejection nozzle size or slit width and the dot size on the plate material can be controlled by controlling the conditions in forming an electrical field.

In other words, according to the present invention, a fine image having a sufficiently long press life can be controlled without causing any problem of ink clogging in the head and a large number of printed matters having a clear image can be printed.

Construction examples of the plate-making apparatus for use in practicing the plate-making method of the present invention are described below.

Figure 7:
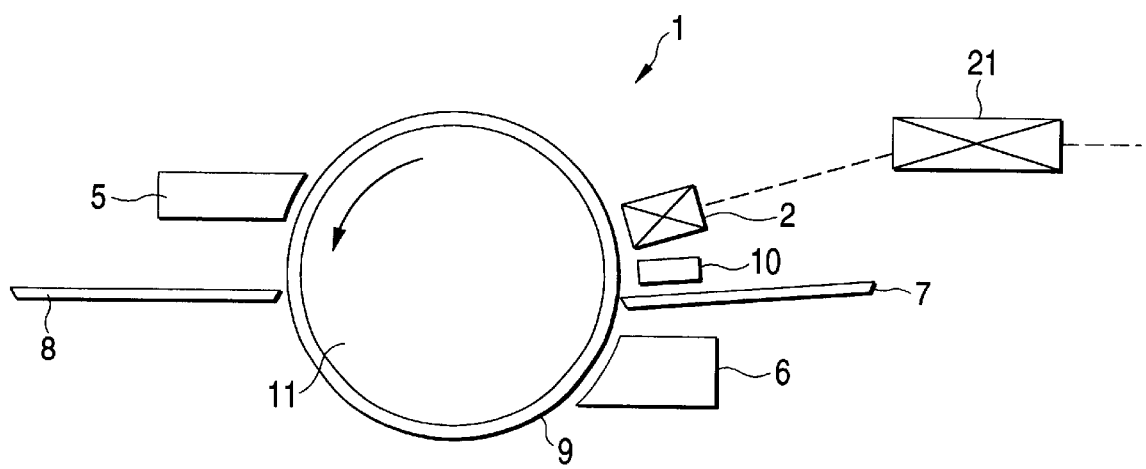
FIG. 7 is an entire construction view schematically showing one example of the plate-making apparatus for use in the present invention.
Figure 8:
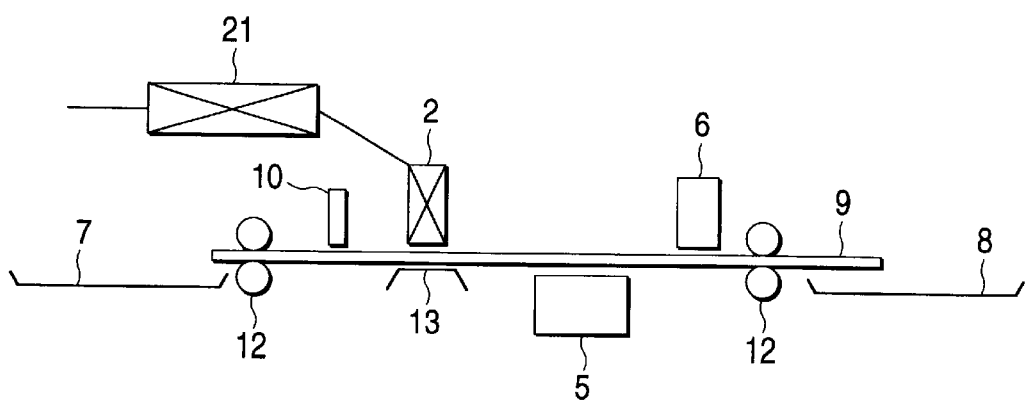
FIG. 8 is an entire construction view schematically showing another example of the plate-making apparatus for use in the present invention.
Figure 9:
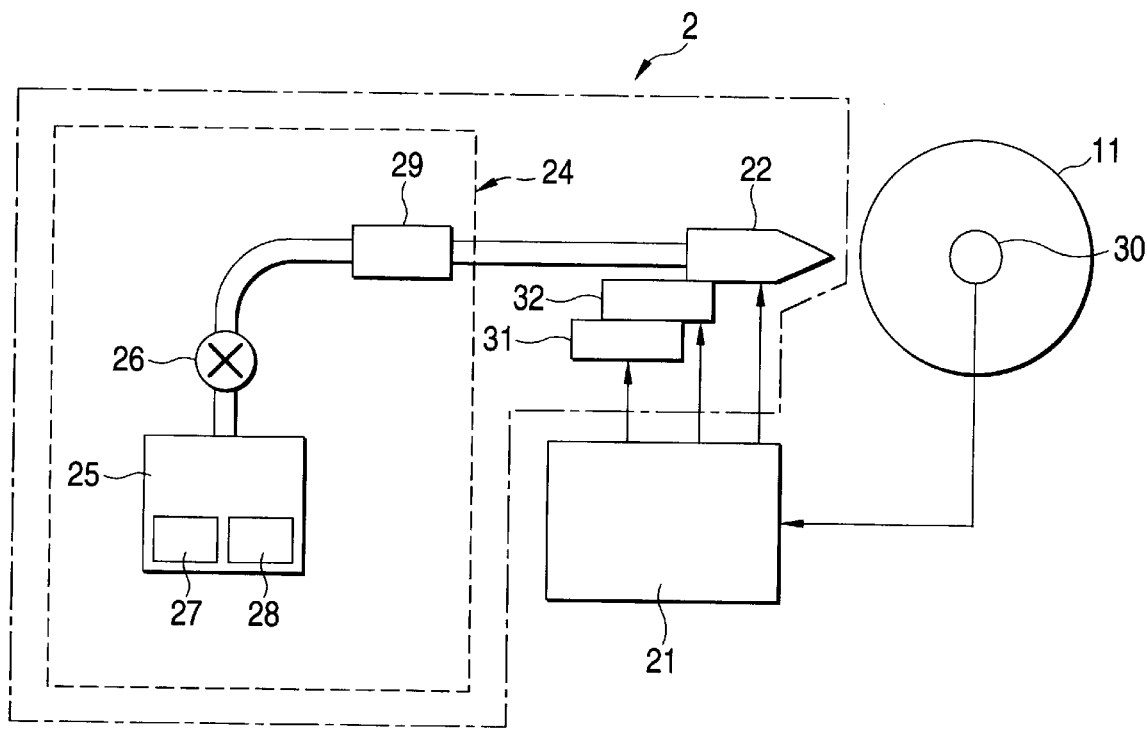
FIG. 9 is a construction view schematically showing one example of the drawing part of the plate-making apparatus for use in the present invention.

FIGS. 7 and 8 each is an entire construction view of a plate-making apparatus. FIG. 9 is a view schematically showing a construction example of the plate-making apparatus including the control part, ink feed part and head-retreating or approximating mechanism. FIGS. 10 to 16 each is a view for explaining an ink jet drawing device of the plate-making apparatus of FIGS. 7 and 8.

The plate-making process according to the present invention is described below using an entire construction view of a plate-making apparatus having a structure shown in FIG. 7 where a plate material is attached to a drum 11, however, the present invention is not limited to the following construction example.

The drum 11 is usually made of a metal such as aluminum, stainless steel and iron, a plastic, a glass or the like. Particularly, in the case of a metal-made drum, the surface thereof is subjected to, for example, an alumite treatment or a chromium plating in many cases so as to strengthen the abrasion resistance or corrosion resistance. The drum 11 may have a heat insulating material on the surface thereof as described later. The drum 11 preferably has an earth function to act as a counter electrode of the ejection head electrode at the electrostatic ejection. In the case where the substrate of the plate material has high insulating property, an electrically conducting layer is preferably provided on the substrate and in this case, means for taking the earth is preferably provided in this electrically conducting layer. Also in the case of providing a heat insulating material on the drum 11, the drawing may be facilitated by providing means for taking the earth on the plate material and for this purpose, known means having electrical conductivity, such as brush, leaf spring or roller, may be used.

The plate-making apparatus 1 further has an ink jet drawing device 2 which ejects an oil ink on the plate material 9 attached to the drum 11 in correspondence to the image data sent from an image data arithmetic and control part 21 and forms an image.

The plate-making apparatus 1 further has a fixing device 5 for strengthening the oil ink image drawn on the plate material 9. If desired, a plate surface desensitizing device 6 may be provided for the purpose of intensifying the hydrophilicity on the surface of the plate material 9. The plate-making apparatus 1 further has dust-removing member 10 of removing dusts present on the surface of the plate material 9 before and/or during the drawing on the plate material 9. By this means, the ink can be effectively prevented from adhering to the plate material 9 by the help of dusts invaded between the head and the plate material during the plate-making and thereby, good plate-making can be attained. For the dust-removing member 10, a known non-contact method such as suction removal, blowing removal or electrostatic removal, or a contact method by a brush, a roller or the like may be used. In the present invention, air suction, air blowing or a combination thereof is preferably used.

Furthermore, an automatic plate feed device 7 of automatically feeding the plate material 9 to the drum 11 and an automatic plate discharge device 8 of automatically removing the plate material 9 from the drum 11 after the completion of drawing may be provided. By using these automatic plate feed device 7 and automatic plate discharge device 8, the plate-making operation is more facilitated and the plate-making time can be shortened, as a result, the effect of the present invention is more enhanced.

The process of preparing a printing plate using the plate-making apparatus 1 is described below by referring to FIG. 7 and partially to FIG. 9.

A plate material 9 is attached to the drum 11 using an automatic plate feed device 7. At this time, the plate material 9 is tightly fixed on the drum 11 by a mechanical method using a known plate head/edge gripping device, an air suction device or the like, or by an electrostatic method, so that the edge of plate can be prevented from fluttering to come into contact with the ink jet drawing device 2 during the drawing and cause damages. Furthermore, means of tightly contacting the plate material 9 to the drum 11 only in the periphery of the drawing position of the ink jet drawing device 2 may be provided and by actuating this at least at the time of performing the drawing, the plate material 9 can be prevented from contacting with the ink jet drawing device 2. To speak specifically, for example, a method of disposing a presser roller upstream and downstream the drawing position on the drum 11 may be used. At the time of not performing the drawing, the head is preferably kept apart from the plate material, whereby the ink jet drawing device 2 can be effectively prevented from generation of troubles such as damage by contact.

The image data arithmetic and control part 21 receives image data from an image scanner, a magnetic disc device, an image data transmission device or the like, performs color separation, if desired, and then partitions and computes the separated data into an appropriate number of picture elements or an appropriate number of gradations. Furthermore, since the oil ink image is drawn as a dotted image using an ejection head 22 (which is described in detail later, see, FIG. 9) of the ink jet drawing device 2, the halftone dot area factor is also computed. In addition, as described later, the image data arithmetic and control part 21 controls the movement of the ejection head 22, the timing of ejecting the oil ink and if desired, the timing of operating the drum 11 and the like.

These data computed and input in the image data arithmetic and control part 21 are once stored in a buffer. The image data arithmetic and control part 21 rotates the drum 11 and approximates the ejection head 22 to the position proximate to the drum 11 using a head-retreating or approximating device 31. The ejection head 22 and the surface of the plate material 9 on the drum 11 are kept at a predetermined distance during the drawing using mechanical distance controlling member such as knock roller or under the control of the head-retreating or approximating device based on the signals from an optical distance detector. By virtue of this distance control, good plate-making can be performed without causing non-uniformity in the dot size due to floating of the plate material or particularly without causing any change in the dot size even when vibration is applied to the plate-making machine.

For the ejection head 22, a single channel head, a multi-channel head or a full line head may be used. The main scanning is performed by the rotation of the drum 11. In the case of a multi-channel head or full line head having a plurality of ejection parts, the array direction of the ejection parts is set to the axial direction of the drum 11. Furthermore, in the case of a single channel head or a multi-channel head, the image data arithmetic and control part 21 moves the ejection head 22 in the axial direction of the drum 11 every each rotation of the drum 11 and an oil ink is ejected to the plate material 9 attached to the drum 11 based on the ejection position and the halftone dot area factor obtained by the computation. Upon this ejection, a halftone image is drawn on the plate material 9 by the oil ink according to the variable density of the printing original. This operation continues until an oil ink image of one color portion of the printing original is formed on the plate material 9 and a printing plate is finished. On the other hand, in the case where the ejection head 22 is a full line head having almost the same length as the width of the drum 11, an oil ink image of one color portion of the printing original is formed on the plate material 9 by one rotation of the drum 11 and thereby a printing plate is finished. As such, the main scanning is performed by the rotation of the drum 11, whereby the positional precision in the main scanning direction can be elevated and high-speed drawing can be performed.

Subsequently, the ejection head 22 is retreated to come apart from the position proximate to the drum 11 so as to protect the ejection head 22. This retreating or approximating member is operated to separate the ejection head at least 500 μm or more apart from the drum except for the drawing time. The retreating/approximating operation may be performed by a slide system or in a pendulum manner by fixing the ejection head 22 using an arm fixed to a certain axis and moving the arm around the axis. By retreating the ejection head 22 at the non-drawing time, the ejection head 22 can be protected from the physical breakage or contamination and can have a long life.

The formed oil ink image is strengthened by a fixing device 5. For fixing the ink, known means such as heat-fixing or solvent fixing may be used. In the heat-fixing, hot air fixing by the irradiation of an infrared lamp, a halogen lamp or a xenon flash lamp or using a heater, or heat-roller fixing is generally employed. In this case, the fixing property can be effectively elevated by using individually or in combination the means such as preheating of the plate material 9, drawing while applying hot air, coating of the drum 11 with a heat insulating material, and heating of only the plate material 9 by separating the plate material 9 from the drum 11 at the fixing. The flash fixing using a xenon lamp or the like is known as a fixing method of electrophotographic toner and this is advantageous in that the fixing can be performed within a short time. In the case of using a paper plate material, the water content inside the plate material abruptly evaporates due to the abrupt elevation of the temperature and a phenomenon called blister of generating asperities on the surface of the plate material takes place. Therefore, it is preferred to gradually elevate the temperature of the paper plate material by gradually increasing the power supply to the heat source while rotating the drum 11 or by changing the rotational speed from high to low with a constant power supply. The temperature of the paper plate material may also be gradually elevated by disposing a plurality of fixing units in the rotational direction of the drum 11 and varying the distance from these to the plate material 9 and/or the supply capability.

In the solvent fixing, a solvent capable of dissolving the resin components in the ink, such as methanol and ethyl acetate, is sprayed or the plate material is exposed to the solvent vapor while recovering excess solvent vapor.

At least in the process from the formation of an oil ink image by the ejection head 22 until the fixing by the fixing device 5, the image on the plate material 9 is preferably kept not to come into contact with any thing.

A construction example of the plate making apparatus which performs the sub-scanning by running a plate material 9 is described below using FIG. 8, however, the present invention is not limited to the following construction example.

A plate material 9 is transported while being interposed and held between two pairs of captain rollers 12. Using data partitioned and computed into an appropriate number of picture elements and an appropriate number of gradations by an image data arithmetic and control part 21, an image is drawn by an ink jet drawing device 2. In the position where an image is drawn by the ink jet drawing device 2, earth means 13 is preferably provided to work out to a counter electrode of the ejection head electrode at the time of electrostatic ejection, whereby the drawing is facilitated. In the case where the substrate of the plate material 9 has high insulating property, an electrically conducting layer is preferably provided on the substrate and in this case, this electrically conducting layer is preferably earthed by known means having electrical conductivity, such as brush, leaf spring or roller.

FIG. 8 shows an apparatus where a sheet plate material is used. However, a roll plate material is also suitably used and in this case, a sheet cutter is preferably provided upstream the automatic plate discharge device.

The plate-making apparatus further has an ink jet drawing device 2 which ejects an oil ink on the plate material 9 in correspondence to the image date sent from the image data arithmetic and control part 21 and forms an image.

The plate-making apparatus 1 further has a fixing device 5 for strengthening the oil ink image drawn on the plate material 9. If desired, a plate surface desensitizing device 6 may be provided for the purpose of intensifying the hydrophilicity on the surface of the plate material 9. The plate-making apparatus 1 further has dust-removing member 10 of removing dusts present on the surface of the plate material before and/or during the drawing on the plate material 9. By this means, the ink can be effectively prevented from adhering to the plate material by the help of dusts invaded between the ejection head and the plate material during the plate-making and thereby, good plate-making can be attained. For the dust-removing member 10, a known non-contact method such as suction removal, blowing removal or electrostatic removal, or a contact method by a brush, a roller or the like may be used. In the present invention, air suction, air blowing or a combination thereof is preferably used.

Furthermore, an automatic plate feed device 7 of automatically feeding the plate material 9 and an automatic plate discharge device 8 of automatically removing the plate material 9 after the completion of drawing are preferably provided. By using these automatic plate feed device 7 and automatic plate discharge device 8, the plate-making operation is more facilitated and the plate-making time can be shortened, as a result, the effect of the present invention is more elevated.

The process of preparing a printing plate using the plate-making apparatus 1 is described below by referring to FIG. 8 and partially to FIG. 9.

A plate material 9 is transported using an automatic plate feed device 7 and captain rollers 12. At this time, if desired, printing material guide means (not shown) or the like may be provided so as to prevent the head/edge of the plate material from fluttering and contacting with an ink jet drawing device 2 to cause damages. Furthermore, means of preventing loosening of the plate material 9 only in the periphery of the drawing position of the ink jet drawing device 2 may be provided and by actuating this means at least at the time of performing the drawing, the plate material 9 can be prevented from contacting with the ink jet drawing device 2. To speak specifically, for example, a method of disposing a presser roller upstream and downstream the drawing position may be used. At the time of not performing the drawing, the ejection head is preferably kept apart from the plate material 9, whereby the ink jet drawing device 2 can be effectively prevented from generation of troubles such as damage by contact.

The image data from a magnetic disk device or the like is given to an image data arithmetic and control part 21 and according to the input image data, the image data arithmetic and control part 21 computes the position of ejecting an oil ink and the halftone dot area factor at that position. These computed data are once stored in a buffer.

The image data arithmetic and control part 21 moves the ejection head 22, controls the timing of ejecting the oil ink and the timing of operating the capstan rollers, and if desired, approximates the ejection head 22 to the position proximate to the plate material 9 using a head-retreating or approximating device 31.

The ejection head 22 and the surface of the plate material 9 are kept at a predetermined distance during the drawing using mechanical distance controlling member such as knock roller or under the control of the head-retreating or approximating device based on the signals from an optical distance detector. By virtue of this distance control, good plate-making can be performed without causing non-uniformity in the dot size due to floating of the plate material or particularly without causing any change in the dot size even when vibration is applied to the plate-making machine.

For the ejection head 22, a single channel head, a multi-channel head or a full line head may be used and the sub-scanning is performed by the transportation of the plate material 9. In the case of a multi-channel head having a plurality of ejection parts, the array direction of ejection parts is set almost in parallel to the running direction of the plate material. Furthermore, in the case of a single channel head or a multi-channel head, the ejection head 22 is moved in the direction orthogonal to the running direction of the plate material 9 by the image data arithmetic and control part 21 every each movement of the plate material and an oil ink is ejected to the plate material 9 at the ejection position and at the halftone dot area factor obtained by the computation. Upon this ejection, a halftone image is drawn on the plate material 9 by the oil ink according to the variable density of the printing original. This operation continues until an oil ink image of one color portion of the printing original is formed on the plate material 9 and a printing plate is finished. On the other hand, in the case where the ejection head 22 is a full line head having almost the same length as the width of the plate material 9, the array direction of ejection parts are set to the direction almost orthogonal to the running direction of the plate material and an oil ink image of one color portion of the printing original is formed on the plate material 9 by passing the plate material 9 through the drawing part, thereby finishing a printing plate.

The ejection head 22 is preferably retreated to come apart from the position proximate to the plate material 9 so as to protect the ejection head 22. This retreating or approximating member is operated to separate the ejection head at least 500 µm or more apart from the plate material 9 except for the drawing time. The retreating or approximating operation may be performed by a slide system or in a pendulum manner by fixing the ejection head using an arm fixed to a certain axis and moving the arm around the axis. By retreating the ejection head at the non-drawing time, the ejection head can be protected from the physical breakage or contamination and can have a long life.

The formed oil ink image is strengthened by a fixing device 5. For fixing the ink, known means such as heat-fixing or solvent fixing may be used. In the heat-fixing, hot air fixing by the irradiation of an infrared lamp, a halogen lamp or a xenon flash lamp or using a heater, or heat-roller fixing is generally employed. The flash fixing using a xenon lamp or the like is known as a fixing method of electrophotographic toner and this is advantageous in that the fixing can be performed within a short time. In the case of using a paper plate material, the water content inside the plate material abruptly evaporates due to the abrupt elevation of the temperature and a phenomenon called blister of generating asperities on the surface of the plate material takes place. Therefore, for preventing the blister of the plate material 9, it is preferred to dispose a plurality of fixing units and gradually elevate the temperature of the paper plate material by changing the power supply and/or the distance from the fixing unit to the plate material 9.

In the solvent fixing, a solvent capable of dissolving the resin components in the ink, such as methanol and ethyl acetate, is sprayed or the plate material is exposed to the solvent vapor while recovering excess solvent vapor.

At least in the process from the formation of an oil ink image by the ejection head 22 until the fixing by the fixing device 5, the image on the plate material 9 is preferably kept not to come into contact with any thing.

The obtained printing plate is subjected to printing by a known lithographic printing process. More specifically, the printing plate having formed thereon the oil ink image is mounted on a press, a printing ink and a fountain solution are given thereto to form a printing ink image, the printing ink image is transferred to a blanket cylinder rotating together with the plate cylinder and subsequently, the printing ink image on the blanket cylinder is transferred to a printing paper sheet passing through between the blanket cylinder and an impression cylinder, thereby performing the printing of one color portion. After the completion of printing, the printing plate is removed from the plate cylinder and the blanket on the blanket cylinder is cleaned by a blanket cleaning device to provide a state ready for next printing.

The ink jet drawing device 2 is described below.

As shown in FIG. 9, the ink jet drawing device 2 for use in the plate-making apparatus comprises an ink jet ejection head 22 and an ink feed part 24. The ink feed part 24 further comprises an ink tank 25, an ink feed device 26, and ink concentration-controlling member 29 and in the ink tank 25, stirring member 27 and ink temperature-controlling member 28 are contained. The ink may be circulated in the ejection head 22 and in this case, the ink feed part 24 additionally has a recovery and circulating function. The stirring member 27 prevents the precipitation and coagulation of solid contents in the ink and reduces the need for cleaning of the ink tank 25. For the stirring member 27, a rotary blade, an ultrasonic vibrator and a circulation pump may be used and these are used individually or in combination. The ink temperature-controlling member 28 is disposed such that the physical properties of ink or the dot size does not vary by the change of the ambient temperature and a high-quality image can be stably formed. For the ink temperature-controlling member, a known method may be used, for example, a method of disposing a heat-generating element or a cooling element such as heater or Peltier device within the ink tank 25 together with the stirring member 27 and maintaining a constant temperature distribution within the ink tank 25 under the control by a temperature sensor such as thermostat. The ink temperature within the ink tank 25 is preferably from 15 to 60° C., more preferably from 20 to 50° C. The stirring member for maintaining a constant temperature distribution within the ink tank 25 may be used commonly as the stirring member for preventing the precipitation or coagulation of solid components in the ink.

In the present invention, the apparatus preferably has ink concentration-controlling member 29 for drawing a high-quality image. By having this means, generation of bleeding on the plate or slipping or thinning of the printing image due to reduction in the solid concentration in the ink, or change in the dot size on the plate due to increase in the solid concentration, can be effectively prevented. The ink concentration is controlled by measuring the physical properties using, for example, optical detection, measurement of electrical conductivity or measurement of viscosity, or by counting the number of plates subjected to the drawing. In the case of controlling the ink concentration by measuring the physical properties, an optical detector, an electrical conductivity-measuring meter and a viscosity-measuring meter are provided individually or in combination within the ink tank 25 or on the passage of ink and according to the output signals thereof, the feed of liquid to the ink tank 25 from a concentrated ink tank (not shown) for replenishment or from a diluting ink carrier tank is controlled. In the case of controlling the ink concentration by counting the number of plates subjected to the drawing, the feed of liquid is controlled by the number of plates manufactured and the frequency of plate-making.

The image data arithmetic and control part 21 computes the input image data and moves the ejection head 22 using a head-retreating or approximating device 31 or head sub-scanning means 32, as described above, and additionally takes in the timing pulse from an encoder 30 disposed in the drum 11 or a capstan roller and drives the ejection head 22 according to the timing pulse. By this, the positional precision is elevated.

The ejection head 22 is described below using FIGS. 10 to 16, however, the present invention is not limited thereto.

Figure 10:
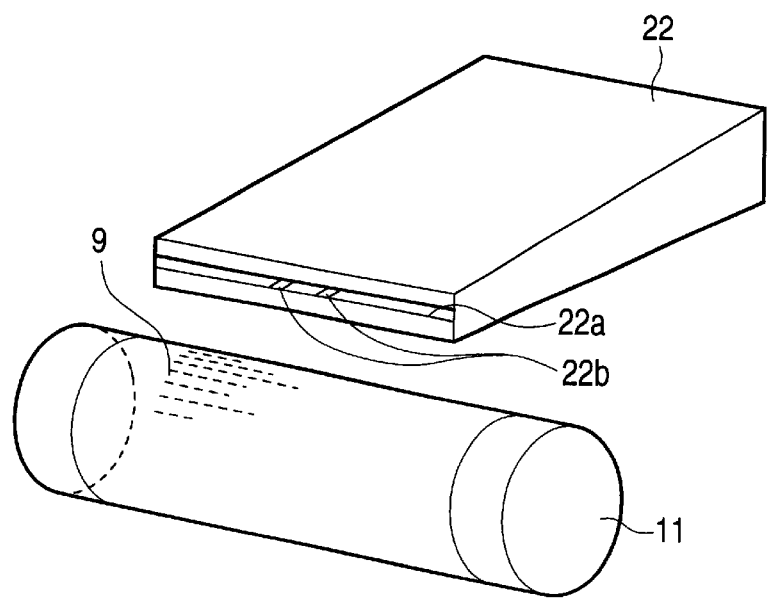
FIG. 10 is a schematic construction view showing one example of the ejection head provided in the ink jet drawing device for use in the present invention.
Figure 11:
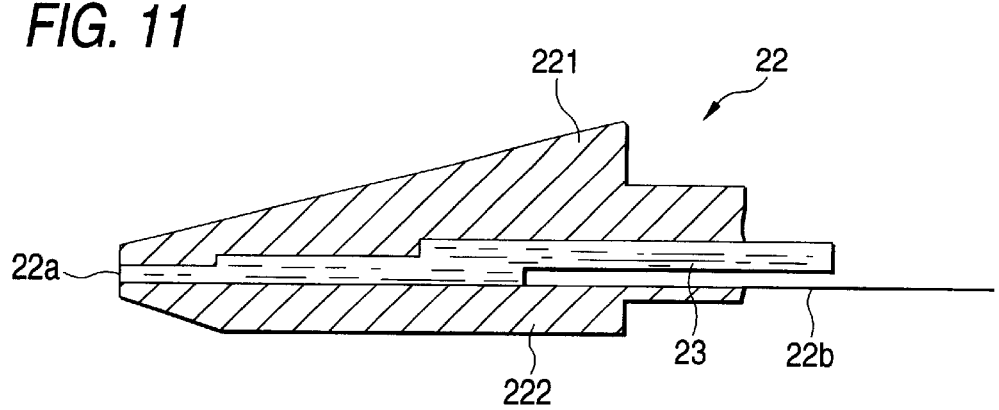
FIG. 11 is a schematic cross-sectional view showing the vicinity of the ink ejection part of FIG. 10.

FIGS. 10 and 11 each is a view showing one example of the ejection head provided in the ink jet drawing device. The ejection head 22 has a slit sandwiched by an upper unit 221 and a lower unit 222 each comprising an insulating substrate, and the distal end of the slit works out to an ejection slit 22a. Within the slit, an ejection electrode 22b is disposed and the slit is filled with an ink 23 fed from the ink feed device. Examples of the insulating substrate which can be used include plastics, glass and ceramics. The ejection electrode 22b is formed by a known method such as a method of subjecting the lower unit 222 comprising an insulating substrate to vapor deposition, sputtering or electroless plating with an electrically conductive material such as aluminum, nickel, chromium, gold and platinum, coating a photoresist thereon, exposing the photoresist through a predetermined electrode pattern mask, developing it to form a photoresist pattern of the ejection electrode 22b and etching the pattern, a method of mechanically removing the photoresist pattern or a method comprising a combination thereof.

As shown in FIG. 10, a drum 11 which works out to a counter electrode is provided to oppose the ejection electrode 22b provided in the ejection head 22 and on the drum 11 as the counter electrode, a plate material 9 is provided. When a voltage is applied to the ejection electrode 22b according to digital signals of the image pattern information, a circuit is formed between the ejection electrode 22b and the drum 11 as the counter electrode, and an oil ink 23 is ejected from the ejection slit 22a of the head 22 to form an image on the plate material 9 provided on the drum 11 as the counter electrode.

With respect to the width of the ejection electrode 22b, the tip thereof is preferably as narrow as possible for forming a high-quality image. The specific numerical value varies according to the conditions such as applied voltage and physical properties of ink but the tip width is usually from 5 to 100 $\mu$m.

For example, a dot of 40 $\mu$m can be formed on the plate material 9 by using an ejection electrode 22b having a tip width of 20 $\mu$m, providing a distance of 1.0 mm between the ejection electrode 22b and the drum 11 as the counter electrode, and applying a voltage of 3 KV between these electrodes for 0.1 msec.

Figure 12:
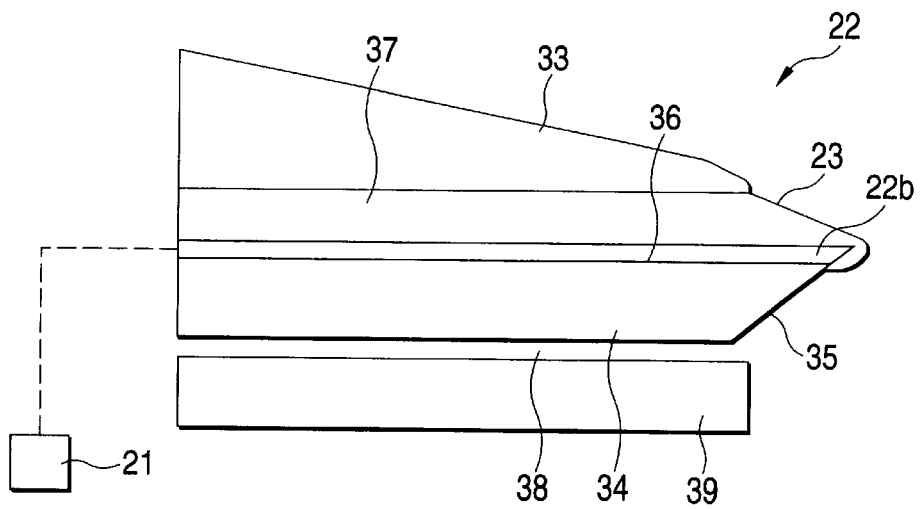
FIG. 12 is a schematic cross-sectional view showing the vicinity of the ink ejection part in another example of the ejection head provided in the ink jet drawing device for use in the present invention.
Figure 13:
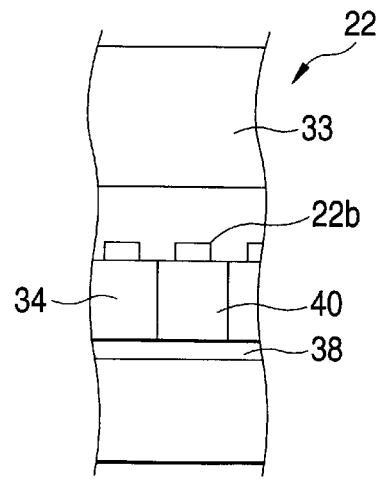
FIG. 13 is a schematic front view showing the vicinity of the ink ejection part of FIG. 12.

FIGS. 12 and 13 are a schematic cross-section view and a schematic front view, respectively, showing the vicinity of the ink ejection part in another example of the ejection head. In the Figures, 22 is an ejection head and this ejection head 22 has a first insulating substrate 33 having a tapered shape. Opposing the first insulating substrate 33, a second insulating substrate 34 is provided with a clearance and at the distal end of the second insulating member 34, an inclined face part 35 is formed. The first and second insulating substrates each is formed of, for example, plastic, glass or ceramic. On the upper face part 36 making an acute angle with respect to the inclined face part 35 of the second insulating substrate 34, a plurality of ejection electrodes 22b are provided as means for forming an electrostatic field in the ejection part. Respective tips of these multiple ejection electrodes 22b are extended to the vicinity of the distal end of the upper face part 36 and the tips each is projected ahead of the first insulating substrate 33 to form an ejection part. Between the first and second insulating substrates 33 and 34, an ink inflow passage 37 is formed as means for feeding an ink 23 to the ejection part and in the lower side of the second insulating substrate 34, an ink recovery passage 38 is formed. The ejection electrode 22b is formed on the second insulating substrate 34 in the same manner as above by a known method using an electrically conducting material such as aluminum, nickel, chromium, gold and platinum. Individual electrodes 22b are constructed to lie in the electrically insulating state from each other.

The tip of the ejection electrode 22b is preferably projected to the length of 2 mm or less from the distal end of the insulating substrate 33. The projection length is preferably within this range because it the projection length is excessively large, the ink meniscus does not reach the tip of the ejection part, as a result, the ejection of ink becomes difficult or the recording frequency decreases. The space between the first and second insulating substrates 33 and 34 is preferably from 0.1 to 3 mm. The space is preferably within this range because if the space is too small, the feed and in turn ejection of ink become difficult or the recording frequency decreases, whereas if the space is excessively large, the meniscus is not stabilized and the ejection becomes unstable.

The ejection electrode 22b is connected to the image data arithmetic and control part 21 and in performing the recording, a voltage is applied to the ejection electrode based on the image information, the ink on the ejection electrode is ejected and an image is drawn on a plate material (not shown) disposed to oppose the ejection part. In the direction opposite the ink droplet-ejecting direction of the ink inflow passage 37, ink feed member of the ink feed device (not shown) is connected. On the surface opposite the ejection electrode-formed surface of the second insulating substrate 34, a backing 39 is provided to oppose the ejection electrode with a clearance. Between these, an ink recovery passage 38 is provided. The ink recovery passage 38 preferably has a space of 0.1 mm or more. The space is preferably within this range because it the space is too small, the recovery of ink becomes difficult and ink leakage may occur. The ink recovery passage 38 is connected to ink recovery member of the ink feed device (not shown).

In the case where a uniform ink flow is necessary on the ejection part, a groove 40 may be provided between the ejection part and the ink recovery part. FIG. 13 is a schematic front view showing the vicinity of the ink ejection part of the ejection head. On the inclined face of the second insulating substrate 34, a plurality of grooves 40 are provided to extend from the vicinity of the boundary with the ejection electrode 22b toward the ink recovery passage 38. These grooves 40 in plurality are aligned in the array direction of the ejection electrodes 22b and each has a function of introducing a constant amount of ink in the vicinity of the tip of the ejection electrode through the opening in the ejection electrode 22b side by a capillary force according to the opening diameter and discharging the introduced ink to the ink recovery passage 38. Therefore, the grooves each has a function of forming an ink flow having a constant liquid thickness in the vicinity of the ejection electrode tip. The shape of the groove 40 may be sufficient if the capillary force can work, but the width is preferably from 10 to 200 μm and the depth is preferably from 10 to 300 μm. The grooves 40 are provided in the number necessary for forming a uniform ink flow throughout the surface of ejection head.

With respect to the width of the ejection electrode 22, the tip of the ejection electrode is preferably as narrow as possible for forming a high-quality image. The specific numerical value varies depending on the applied voltage, physical properties of ink or the like, however, the tip width is usually from 5 to 100 μm.

Figure 14:
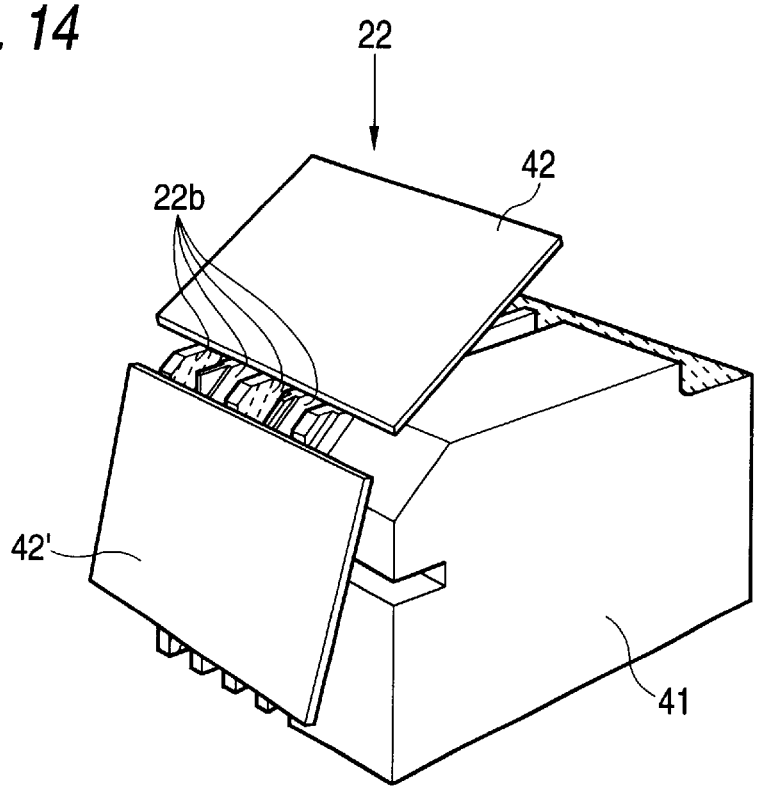
FIG. 14 is a schematic construction view showing main parts in another example of the ejection head provided in the ink jet drawing device for use in the present invention.
Figure 15:
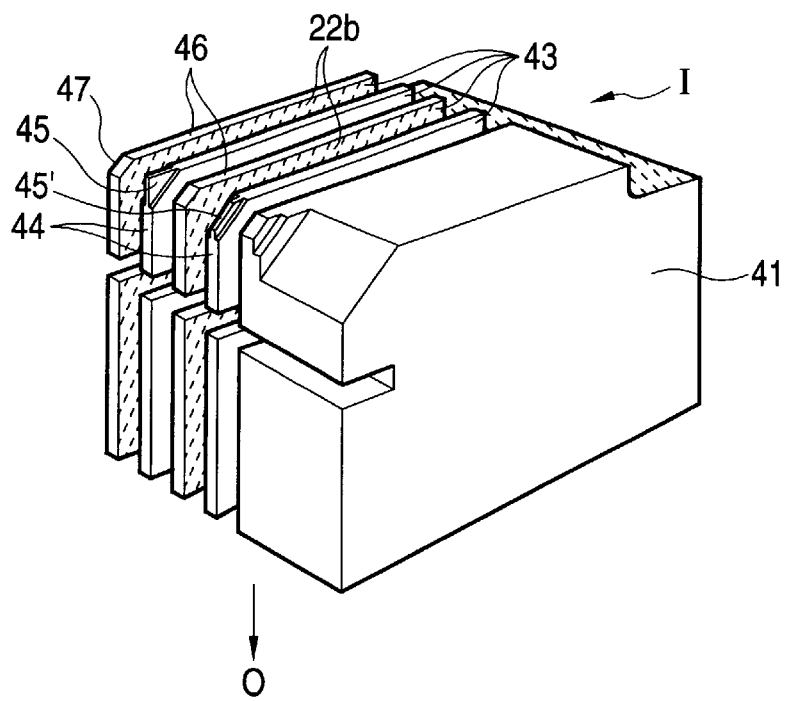
FIG. 15 is a schematic construction view showing the ejection head of FIG. 14 from which regulating plates are removed.

FIGS. 14 and 15 each is a view showing another example of the ejection head for use in practicing the present invention. FIG. 14 is a schematic view showing only a part of the head for the purpose of explanation. As shown in FIG. 14, the ejection head 22 comprises a head body 41 formed of an insulating material such as plastic, ceramic or glass, and meniscus regulating plates 42 and 42'. In the Figures, 22b is an ejection electrode for applying a voltage and thereby forming an electrostatic field in the ejection part. The head body is described in detail below by referring to FIG. 15 where the regulating plates 42 and 42' are removed from the ejection head 22.

In the head body 41, a plurality of ink grooves 43 for circulating the ink are provided perpendicularly to the edge of the head body. The shape of the ink groove 43 may be sufficient if a capillary force can work to form a uniform ink flow, but the width of the ink groove is preferably from 10 to 200 μm and the depth is preferably from 10 to 300 μm. Inside the ink groove 43, an ejection electrode 22b is provided. This ejection electrode 22b may be provided throughout or only on a part of the inner surface of the ink groove 43 of the head body 40 comprising an insulating material, similarly to the case of the above-described apparatus, by a known method using an electrically conducting material such as aluminum, nickel, chromium, gold and platinum. The ejection electrodes are electrically isolated from each other. One cell is formed by two adjacent ink grooves and in the center thereof, a partition 44 is disposed. At the distal end of the partition, ejection parts 45, 45' are provided. The partition is reduced in the thickness and sharpened at the ejection parts 45, 45' as compared with other parts of the partition 44. Such a head body is manufactured using an insulating material block by a known method such as mechanical working, etching or molding. The thickness of the partition at the ejection part is preferably from 5 to 100 μm and the radius of curvature at the sharpened tip is preferably from 5 to 50 μm. The ejection part may be slightly chamfered as shown by 45'. In the Figures where only two cells are shown, the cells are divided by a partition 46 and the distal end 47 thereof is chambered to recede than the ejection parts 45, 45'. An ink is flown into this ejection head through the ink groove from the I direction by the ink feed member of the ink feed device (not shown) to feed the ink to the ejection part. The excess ink is recovered toward the 0 direction by ink recovery member (not shown), whereby a fresh ink is always fed to the ejection part. In this sate, a voltage is applied to the ejection electrodes according to the image information, whereby an ink is ejected from the ejection parts to the drum (not shown) provided to oppose the ejection part and holding on the surface thereof a plate material and an image is formed on the plate material.

Figure 16:
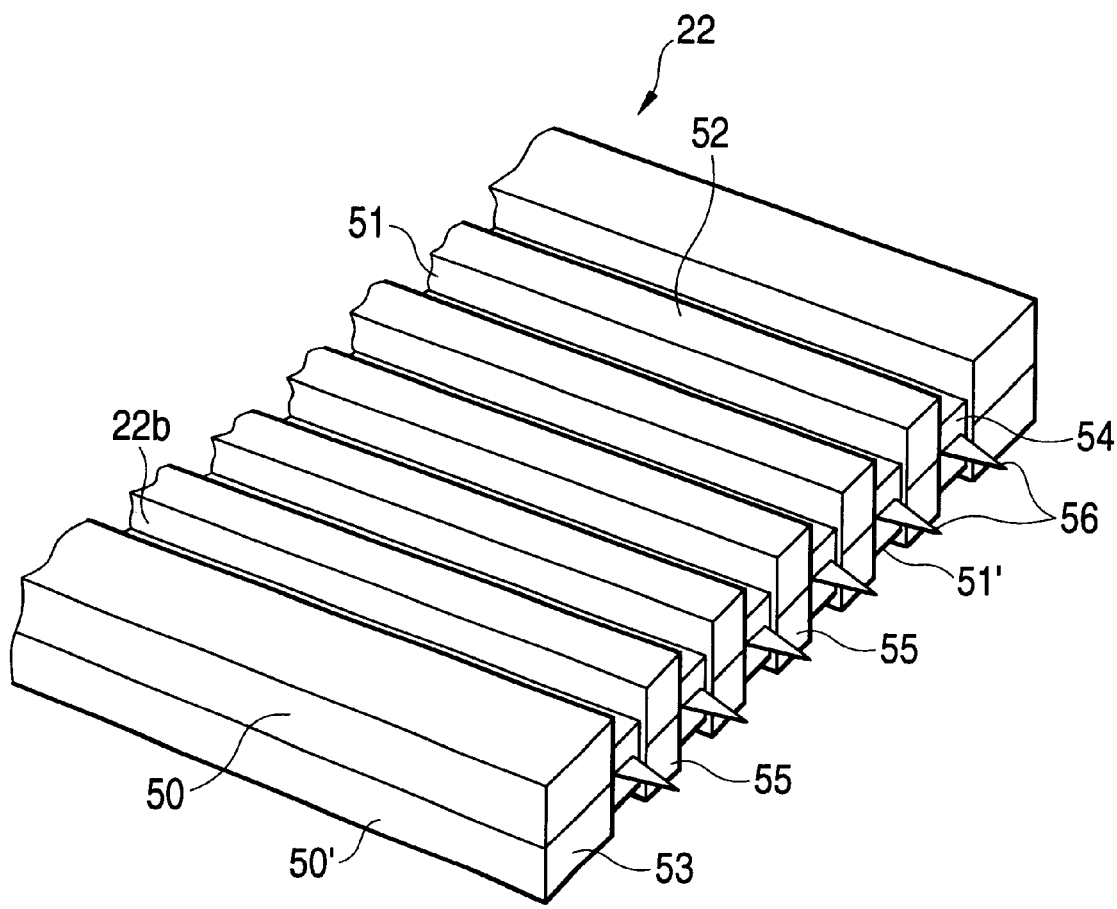
FIG. 16 is a schematic construction view showing main parts in another example of the ejection head provided in the ink jet drawing device for use in the present invention.

Another example of the ejection head is described using FIG. 16. As shown in FIG. 16, the ejection head 22 has a pair of support members 50 and 50' nearly in the rectangular shape. These support members 50 and 50' are formed of a plate-like material having an insulating property, such as plastic, glass or ceramic, and having a thickness of 1 to 10 mm. On one surface of each support member, a plurality of rectangular grooves 51, 51' extending in parallel to each other are formed according to the recording resolution. Each groove 51, 51' preferably has a width of 10 to 200 μm and a depth of 10 to 300 μm. Throughout or on a part of the inside thereof, an ejection electrode 22b is formed. By forming a plurality of grooves 51, 51' on one surface of each support 50, 50' as such, a plurality of rectangular partitions 52 are necessarily provided between respective grooves 51. The support members 50 and 50' are combined such that the surfaces having not provided thereon the grooves 51, 51' face each other. Namely, the ejection head 22 has on the outer peripheral surface thereof a plurality of grooves for passing an ink. The grooves 51 and 51' formed on respective support members 50 and 50' are connected through the rectangular part 54 of the ejection head 22 to correspond one by one. The rectangular parts 54 resultant from the combining of respective grooves each recedes to a predetermined distance (from 50 to 500 μm) from the upper end 53 of the ejection head 22. In other words, the upper end 55 of each partition 52 in both sides of each rectangular part 54 of respective support members 50 and 50' projects from the rectangular part 54. On each rectangular part 54, a guide projection 56 comprising an insulating material described above is provided to project therefrom, thereby forming an ejection part.

In the case of circulating an ink to the thus-constructed ejection head 22, an ink is fed to each rectangular part 54 through each groove 51 formed on the outer peripheral surface of one support member 50 and discharged through each groove 51' formed on the support member 50' in the opposite side. In this case, the ejection head 22 is inclined at a predetermined angle so as to enable smooth flow of the ink. That is, the ejection head 22 is inclined such that the ink feed side (support member 50) is positioned upward and the ink discharge side (support member 50') is positioned downward. When an ink is circulated to the ejection head 22, the ink passing through each rectangular part 54 comes to full wetting along each projection 56, and an ink meniscus is formed in the vicinity of the rectangular part 54 and the projection 56. In this state where ink meniscuses are formed independently from each other on respective rectangular parts 54, a voltage is applied to the ejection electrode 22b based on the image information and thereby, an ink is ejected from the ejection part toward the drum (not shown) provided to oppose the ejection part and holding on the surface thereof a plate material, as a result, an image is formed on the plate material. Here, a cover for covering the grooves may be provided on the outer circumferential surface of each support member 50, 50' to form a piped ink passage on the outer circumferential surface of each support member 50, 50' and thereby forcedly circulate the ink through this ink passage. In this case, the ejection head 22 needs not be inclined.

The ejection head 22 described above using FIGS. 10 to 16 may contain a maintenance device such as cleaning member, if desired. For example, in the case where the dormant state continues or where a trouble is generated in the image quality, means for wiping off the ejection head tip with a material having flexibility, such as scrub, brush or cloth, circulating only an ink solvent, feeding only an ink solvent, and sucking the ejection part while circulating the ink solvent, may be used and by using these means individually or in combination, good drawing state can be maintained. For preventing the solidification of ink, it is effective to cool the head part and thereby suppress the evaporation of ink solvent. In the case where the contamination is more sticking, a method of enforcedly sucking the ink from the ejection part, a method of enforcedly flowing an air, ink or ink solvent jet from the ink passage, a method of applying an ultrasonic wave while dipping the head in an ink solvent and the like are effective. These methods may be used individually or in combination.

It is also found effective to flow a cleaning solution to the ink passage at the time of cleaning the ink passage in the ink circulation line of the plate-making apparatus.

Figure 1:
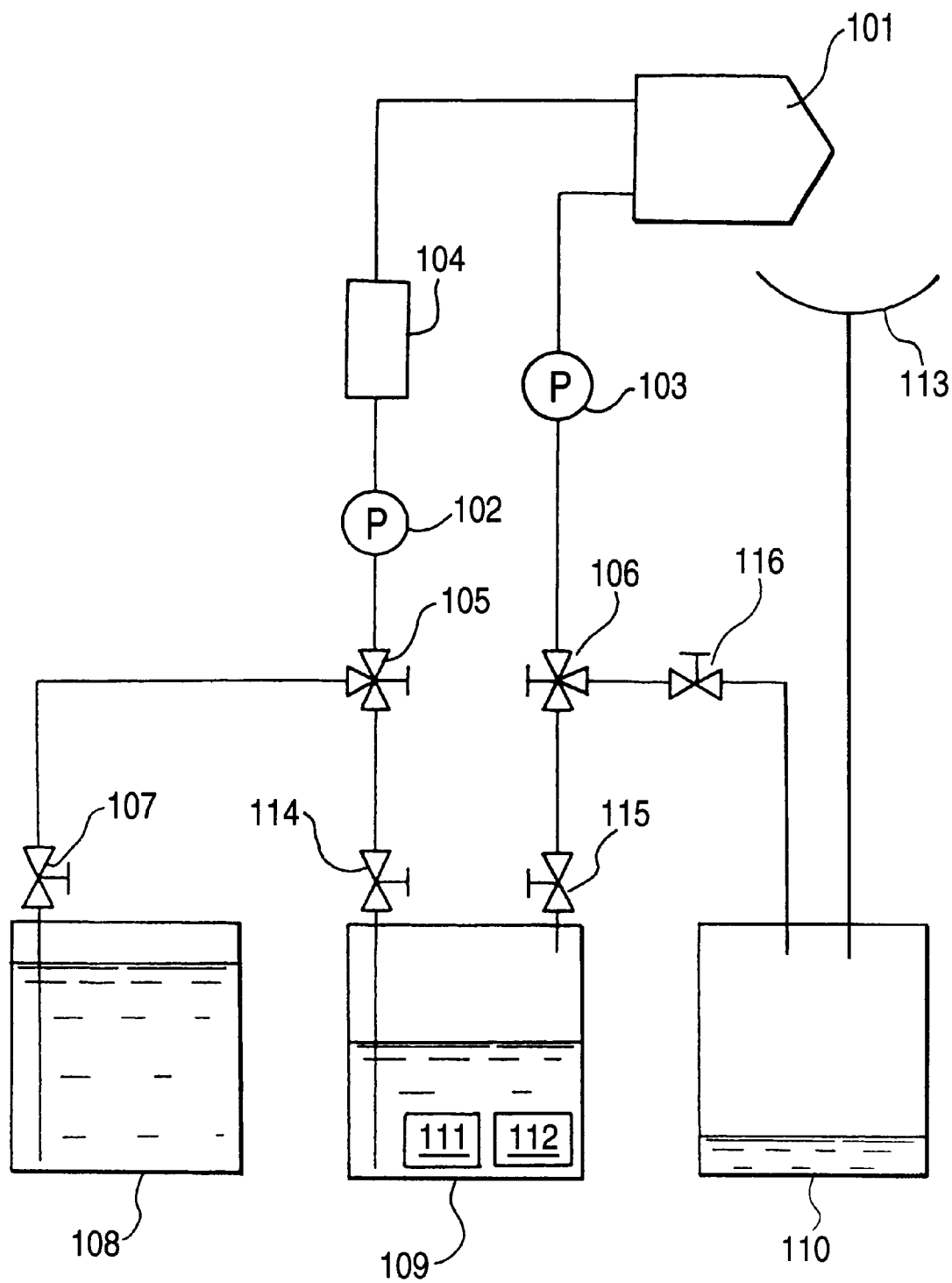
FIG. 1 shows an example of cleaning solution non-circulating type employing a pump pressure circulating system according to the first embodiment of the present invention.

FIG. 1 is a view showing an example of cleaning solution non-circulating type employing a pump pressure circulating system according to the first embodiment of the present invention, where in the ink circulation line of a plate-making apparatus of performing one-side one-color printing on the above-described rolled plate material, the ink is changed over to the cleaning solution at the time of cleaning the ink passage. In FIG. 1, 101 is head, 102 and 103 are liquid transportation pumps, 104 is ink concentration-controlling member, 105 and 106 are three-way valves, 107, 114, 115 and 116 are valves, 108 is a cleaning solution tank, 109 is an ink tank, 110 is a waste solution tank, 111 is stirring member, 112 is ink temperature-controlling member and 113 is a receiver pan.

(1) Cleaning Solution Non-Circulating Type (Pump Pressure Circulating System)

Cleaning Pattern 1

At the time of cleaning, the valve 107 is opened and the valve 114 is closed. The three-way valve 105 is opened to the cleaning-solution tank 108 side and the three-way valve 106 is opened to the waste solution tank 110 side. The cleaning solution is flown to the waste solution tank 110 side by switching over the valve 115 to the CLOSE side and thereby, the ink passages (between the three-way valve 105 and the head 101 and between the head 101 and the three-way valve 106) and the ejection part (electrode) of the head 101 are cleaned. The cleaning solution is discharged to the waste solution tank 110 (at this time, the valve 116 is always in the OPEN state).

Cleaning Pattern 2

In addition to the cleaning pattern 1, the flow rates of the liquid transportation pumps 102 and 103 are elevated. More specifically, at the time of cleaning, the valve 107 is opened and the valve 114 is closed. The three-way valve 105 is opened to the cleaning solution tank 108 side and the three-way valve 106 is opened to the waste solution tank 110 side. The cleaning solution is flown to the waste solution tank 110 side by switching over the valve 115 to the CLOSE side and thereby, the ink passages (between the three-way valve 105 and the head 101 and between the head 101 and the three-way valve 106) and the ejection part (electrode) of the head 101 are cleaned. The cleaning solution is discharged to the waste solution tank 110 (the valve 116 is always in the OPEN state). At this time, the liquid transportation pumps 102 and 103 are elevated in the flow rate and the flow velocity, whereby the cleaning effect can be enhanced.

Cleaning Pattern 3

In addition to the cleaning pattern 1, the ejection amount of only the liquid transportation pump 102 is elevated.

More specifically, at the time of cleaning, the valve 107 is opened and the valve 114 is closed. The three-way valve 105 is opened to the cleaning solution tank 108 side and the three-way valve 106 is opened to the waste solution tank 110 side. The cleaning solution is flown to the waste solution tank 110 side by switching over the valve 115 to the CLOSE side and thereby, the ink passages (between the three-way valve 105 and the head 101 and between the head 101 and the three-way valve 106) and the ejection part (electrode) of the head 101 are cleaned. The cleaning solution is discharged to the waste solution tank 110 (the valve 116 is always in the OPEN state). At this time, only the liquid transportation pump 102 is elevated in the ejection amount, whereby the cleaning solution leaks out from the head ejection part and cleans the distal end of the head ejection part and more effective cleaning can be attained. The cleaning solution leaked out is discharged to the waste solution tank 110 through the receiver pan 113.

Stopping Time

From the state in the cleaning pattern 1, 2 or 3, the liquid transportation pumps 102 and 103 are stopped and almost simultaneously, the valves 107 and 116 are switched over to the CLOSE side. As a result, the cleaning solution is filled in the liquid transportation line at the stopping time and therefore, the liquid transportation line can be kept clean.

In this case, the switch over of the three-way valve 106 at the cleaning may be performed later than the three-way valve 105 so as to reduce the outflow of the ink to the waste solution tank 110. The three-way valve 106 is most preferably switched over immediately before the cleaning solution reaches it. The timing t (second) thereof can be easily calculated by the following equation (2) through the equation (1) established among the liquid transported amount Q per 1 second of the liquid transportation pump 102 or 103, the radius r inside the pipe and the pipe line length L:

$$Q \cdot t = L \cdot \pi r^2 \qquad (1)$$

$$t = L \cdot \pi r^2 / Q \qquad (2)$$

Figure 2:
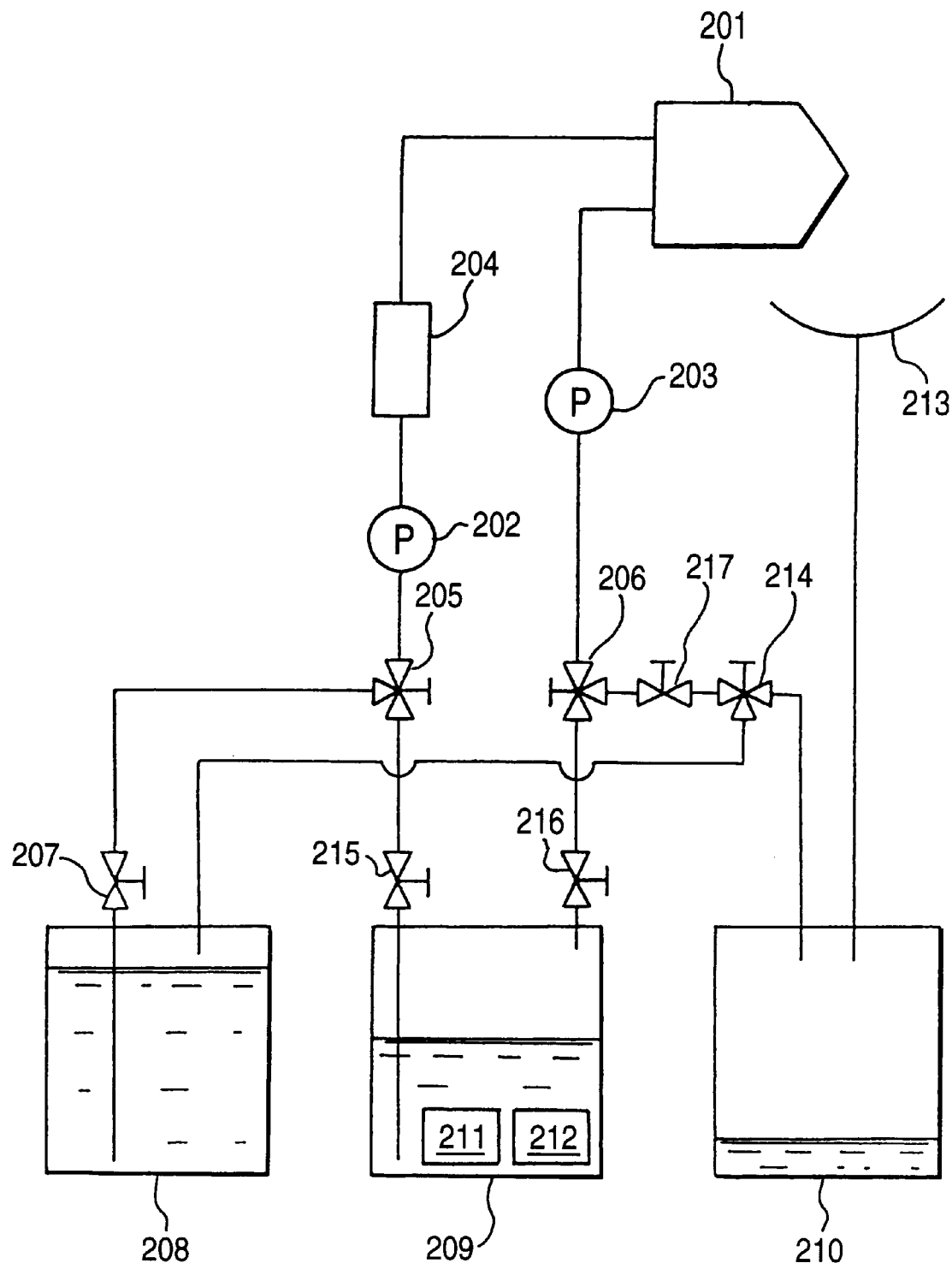
FIG. 2 is a view showing an example of cleaning solution circulating type employing a pump pressure circulating system according to the second embodiment of the present invention.

FIG. 2 is a view showing an example of cleaning solution circulating type employing a pump pressure circulating system according to the second embodiment of the present invention. In FIG. 2, 201 is a head, 202 and 203 are liquid transportation pumps, 204 is ink concentration-controlling member, 205, 206 and 214 are three-way valves, 207, 215, 216 and 217 are valves, 208 is a cleaning solution tank, 209 is an ink tank, 210 is a waste solution tank, 211 is stirring member, 212 is ink temperature-controlling member and 213 is a receiver pan.

(2) Cleaning Solution Circulating Type (Pump Pressure Circulating System)

Cleaning Pattern 1

At the time of cleaning, the valve 207 is opened and the valve 215 is closed. The three-way valve 205 is opened to the cleaning solution tank 208 side, the three-way valve 206 is switched over to the waste solution tank 210 side, and the valve 216 is closed. Here, the three-way valve 214 is still opened to the waste tank solution 210 side. At the timing when the cleaning solution passing through the three-way valve 214 becomes clean, the three-way valve 214 is switched over to the cleaning solution tank 208 side to circulate the cleaning solution. At this time, the valve 217 is always in the OPEN state.

Cleaning Pattern 2

In addition to the "Cleaning Pattern 1" above, in the cleaning pattern 2, the flow rates of the liquid transportation pumps 202 and 203 are elevated. More specifically, at the time of cleaning, the valve 207 is opened and the valve 215 is closed. The three-way valve 205 is opened to the cleaning solution tank 208 side, the three-way valve 206 is switched over to the waste solution tank 210 side, and the valve 216 is closed. Here, the three-way valve 214 is still opened to the waste tank solution 210 side. At the timing when the cleaning solution passing through the three-way valve 214 becomes clean, the three-way valve 214 is switched over to the cleaning solution tank 208 side to circulate the cleaning solution. The valve 217 is always in the OPEN state. At this time, the liquid transportation pumps 202 and 203 are elevated in the flow rate and the flow velocity, whereby the cleaning effect can be enhanced.

Cleaning Pattern 3

In addition to the cleaning pattern 1, the ejection amount of only the liquid transportation pump 202 is elevated. By this operation, the cleaning solution leaks out from the head ejection part 201 and the cleaning from the head ejection part can be effectively performed. The cleaning solution leaked out is discharged to the waste solution tank 210 through the receiver pan 213. This cleaning pattern 3 provides a higher effect if it is performed at the initiation and the completion of cleaning.

Stopping Time

From the state in the cleaning pattern 1, 2 or 3, the liquid transportation pumps 202 and 203 are stopped and almost simultaneously, the valves 207 and 217 are switched over to CLOSE, whereby the cleaning solution is filled in the liquid transportation line at the stopping time and therefore, the liquid transportation line can be kept clean.

In this case, the switch over of the three-way valve 206 may be performed later than the three-way valve 205 so as to reduce the outflow of the ink to the waste solution tank 210. The three-way valve 206 is most preferably switched over immediately before the cleaning solution reaches it. The timing thereof is the same as that described above.

(3) Cleaning Solution Non-Circulating Type (Hydrostatic Pressure System Circulation Line)

Figure 3:
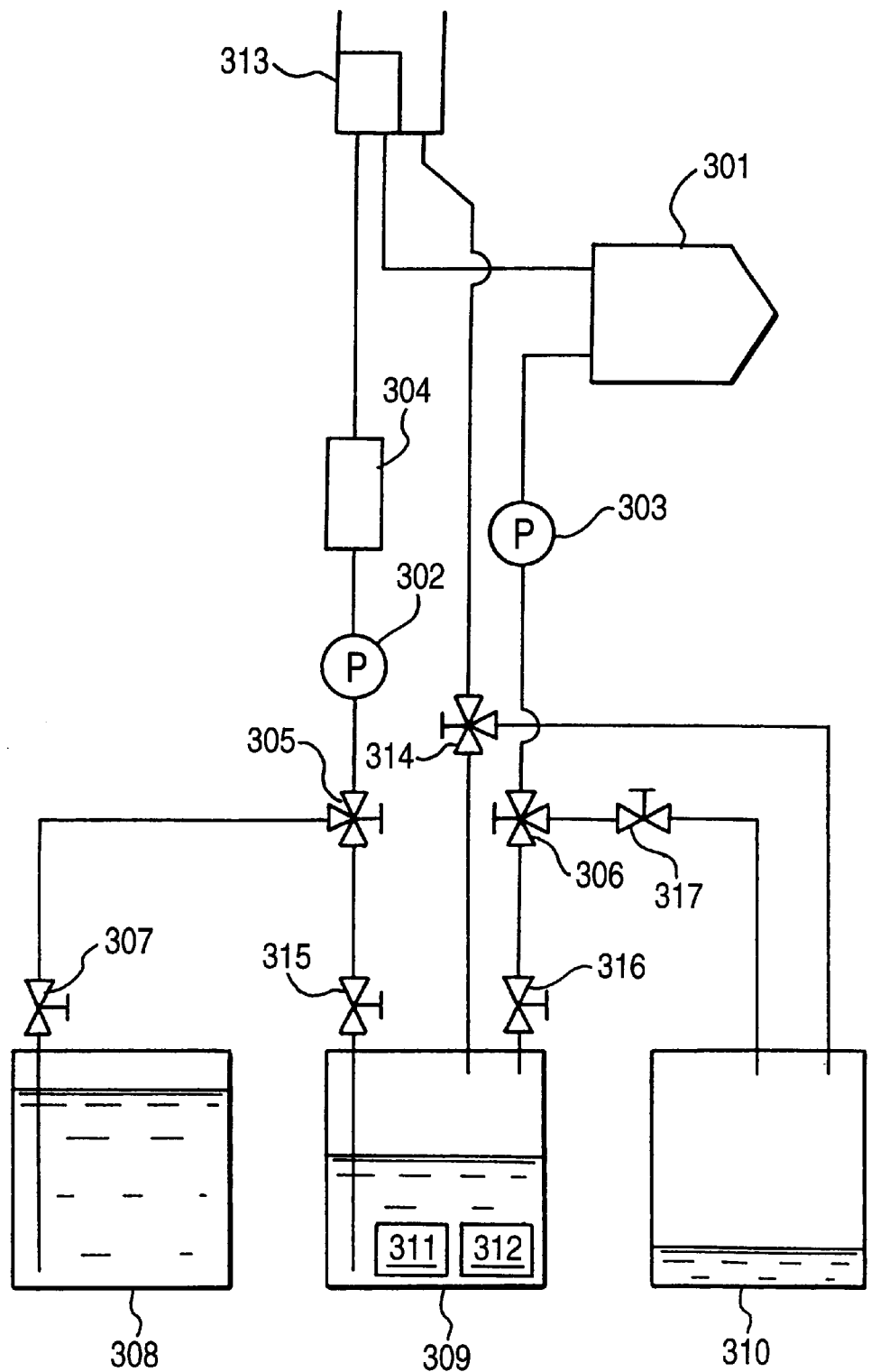
FIG. 3 is a view showing an example of cleaning solution non-circulating type employing a hydrostatic pressure system circulation line according to the third embodiment of the present invention.

FIG. 3 is a view showing an example of cleaning solution non-circulating type employing a hydrostatic pressure system circulation line according to the third embodiment of the present invention. In FIG. 3, 301 is a head, 302 and 303 are liquid transportation pumps, 304 is ink concentration-controlling member, and 305, 306 and 314 are three-way valves. The three-way valve 314 is used for changing over the overflow solution to the ink tank 309 side or to the waste solution tank 310 side. The numerals 307, 315, 316 and 317 are valves, 308 is a cleaning solution tank, 309 is an ink tank, 310 is a waste solution tank, 311 is stirring member, 312 is ink temperature-controlling member and 313 is a hydrostatic pressure tank. This hydrostatic pressure system is a system where a hydrostatic pressure tank 313 storing ink is placed on a vertically movable table and the ink static pressure imposed on the head 301 is controlled by vertically moving the hydrostatic pressure tank 313. This system is characterized in that the liquid pressure imposed on the head 301 does not pulsate.

At the time of cleaning, the valve 307 is opened, the valve 315 is closed, the three-way valve 305 is opened to the cleaning solution tank 308 side, the three-way valves 306 and 314 are opened to the waste solution tank 310 side and the valve 316 is switched over to CLOSE, whereby the cleaning solution is flown to the ink passages (between the three-way valve 305 and the head 301 through the hydrostatic pressure tank 313, between the overflow part of the hydrostatic pressure tank 313 and the three-way valve 314, and between the head 301 and the three-way valve 306) and the ejection part (electrode) of the head 301 to clean these passages and part.

In stopping the apparatus from the above-described cleaning state, the liquid transportation pumps 302 and 303 are stopped and almost simultaneously, the valves 307 and 317 are switched over to CLOSE.

(4) Cleaning Solution Circulating Type (Hydrostatic Pressure System Circulation Line)

Figure 4:
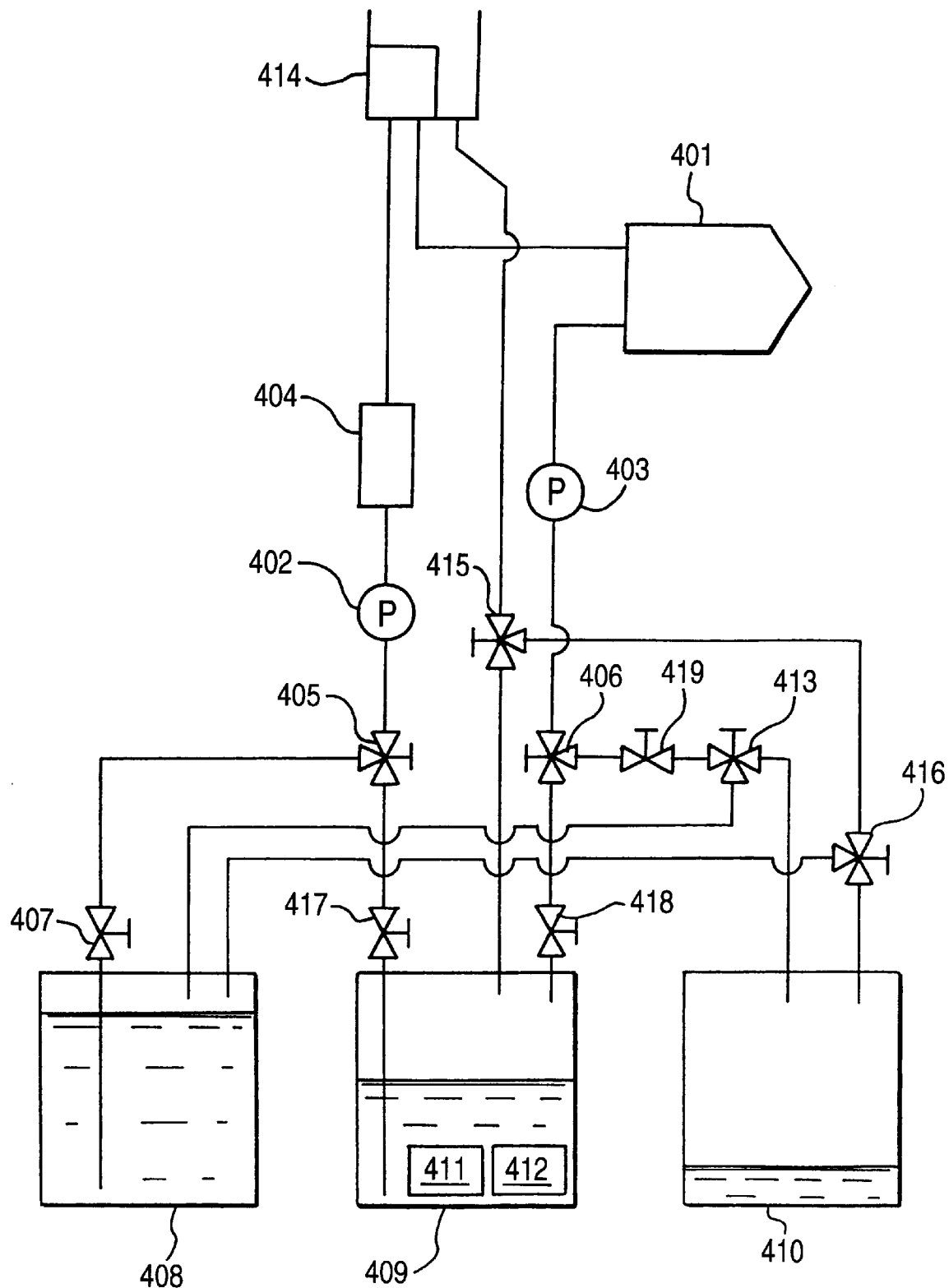
FIG. 4 is a view showing an example of cleaning solution circulating type employing a hydrostatic pressure system circulation line according to the fourth embodiment of the present invention.

FIG. 4 is a view showing an example of cleaning solution circulating type employing a hydrostatic pressure system circulation line according to the fourth embodiment of the present invention. In FIG. 4, 401 is a head, 402 and 403 are liquid transportation pumps in the feed side and the return side, respectively, 404 is ink concentration-controlling member, and 405, 406, 413, 415 and 416 are three-way valves. The three-way valve 405 is used for changing over the ink/cleaning solution in the feed side, the three-way valve 406 is used for the changeover to the ink tank 409 side/waste solution tank 410 side in the return side, the three-way valve 413 is used for changing over the place where the cleaning solution flows, and performs the changeover to the cleaning solution tank 408/waste solution tank 410, the three-way valve 415 is used for changing over the overflow solution to the ink tank 409 side/waste solution tank 410 side, and the three-way valve 416 is used for changing over the place where the overflow cleaning solution flows, and performs the changeover to the cleaning solution tank 408 side/waste solution tank 410 side. The numerals 407, 417, 418 and 419 are valves, 408 is a cleaning solution tank, 409 is an ink tank, 410 is a waste solution tank, 411 is stirring member, 412 is ink temperature-controlling member and 414 is a hydrostatic pressure tank.

At the initiation of cleaning, the valve 407 is opened, the valve 417 is closed, the three-way valve 405 is opened to the cleaning solution tank 408 side, the three-way valves 406 and 415 are opened to the waste solution tank 410 side and the valve 418 is switched over to CLOSE. Here, the three-way valves 413 and 416 are still opened to the waste solution tank 410 side. At the timing when the cleaning solution passing through the three-way valves 413 and 416 becomes clean, the three-way valves 413 and 416 are switched over to the cleaning solution tank 408 side to circulate the cleaning solution. The cleaning solution is preferably always circulated except for the plate-making time.

In stopping the apparatus from the above-described cleaning state, the liquid transportation pumps 402 and 403 are stopped and almost simultaneously, the valves 407 and 419 are switched over to CLOSE.

(5) Cleaning Solution Non-Circulating Type (Hydrostatic Pressure System and Cleaning time Pressure Feed Line)

Figure 5:
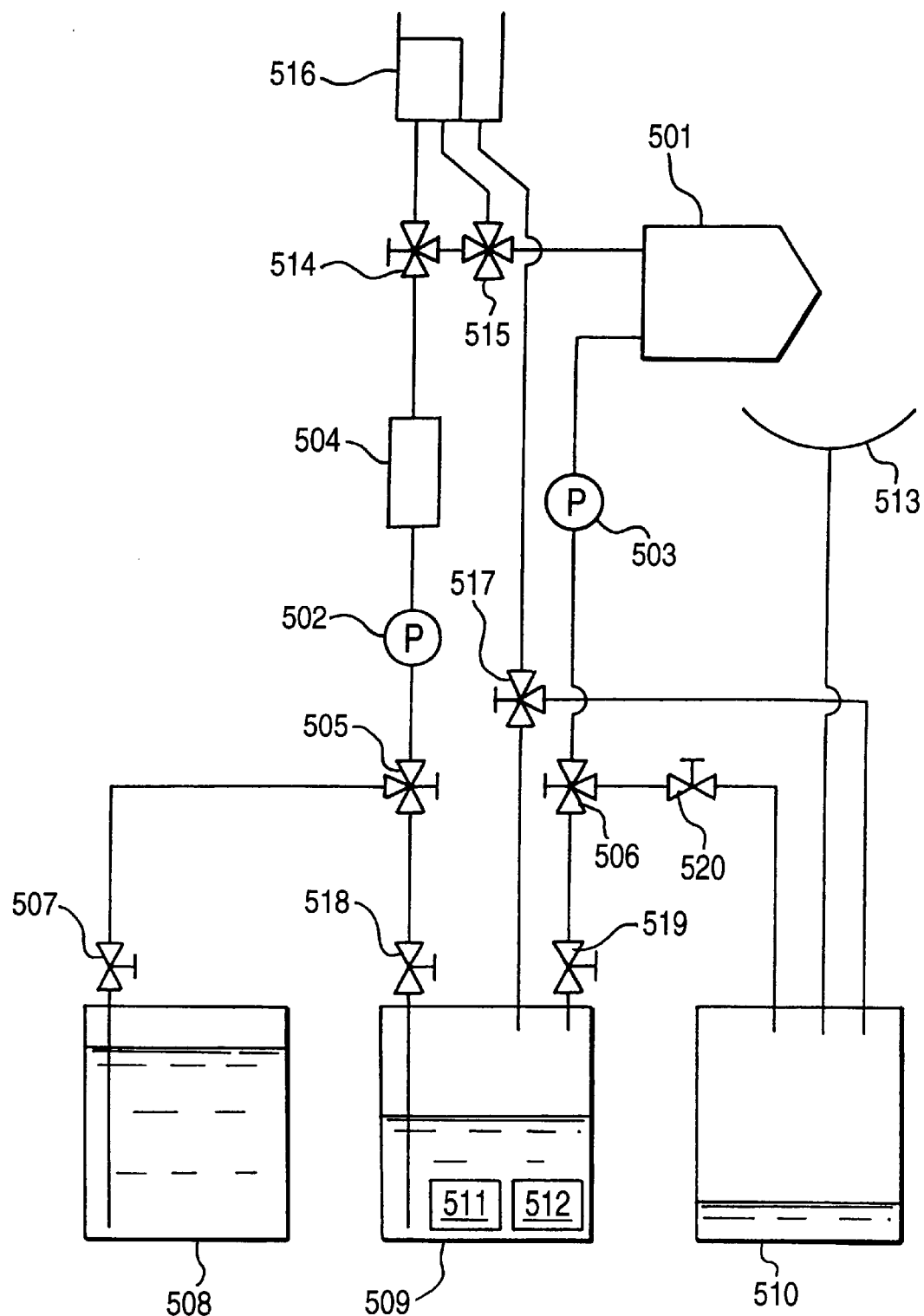
FIG. 5 is a view showing an example of cleaning solution non-circulating type employing a hydrostatic pressure system and a cleaning time pressure feed line according to the fifth embodiment of the present invention.

FIG. 5 is a view showing an example of cleaning solution non-circulating type employing hydrostatic pressure system and cleaning time pressure feed line according to the fifth embodiment of the present invention. In FIG. 5, 501 is a head, 502 and 503 are liquid transportation pumps in the feed side and the return side, respectively, 504 is ink concentration-controlling member, and 505, 506, 514, 515 and 517 are three-way valves. The three-way valve 505 is used for changing over the ink/cleaning solution in the feed side, the three-way valve 506 is used for the changeover to the ink tank 509 side/waste solution tank 510 side in the return side, the three-way valves 514 and 515 are used for the bypass changeover to bypass the hydrostatic pressure tank 516 at the time of cleaning, and the three-way valve 517 is used for changing over the overflow solution to the ink tank 509 side/waste solution tank 510 side. The numerals 507, 518, 519 and 520 are valves, 508 is a cleaning solution tank, 509 is an ink tank, 510 is a waste solution tank, 511 is stirring member, 512 is ink temperature-controlling member, 513 is a receiver pan and 516 is a hydrostatic pressure tank.

According to this embodiment, at the time of cleaning, the three-way valves 514 and 515 are switched over to bypass the hydrostatic pressure tank 516 and press-feed the head cleaning solution directly to the head 501, whereby the effective cleaning of the head 501 is quickly performed. More specifically, in this cleaning pattern, at the time of cleaning, the valve 507 is opened, the valve 518 is closed, the three-way valve 505 is opened to the cleaning solution tank 508 side, the three-way valves 506 and 517 are opened to the waste solution tank 510 side and the valve 519 is switched over to CLOSE. Thereafter, a cleaning solution is flown to the waste solution tank 510 side to clean the ink passages (between the three-way valve 505 and the head 501 and between the head 501 and the three-way valve 506) and the ejection part (electrode) of the head 501. The cleaning of the head 501 is performed by ejecting the cleaning solution to the receiver pan 513 from the head 501. This cleaning solution is discharged to the waste solution tank 510 (here, the valve 520 is always in the OPEN state).

At this time, the liquid transportation pumps 502 and 503 are elevated in the flow rate and the flow velocity and thereby, the cleaning effect can be enhanced.

Furthermore, when only the liquid transportation pump 502 is elevated in the ejection amount, the cleaning solution leaks out from the head ejection part 501 and the cleaning from the head ejection part can be effectively performed. The cleaning solution leaked out is discharged to the waste solution tank 510 through the receiver pan 513. This cleaning provides a higher effect if it is performed at the initiation and the completion of cleaning.

In stopping the apparatus from the above-described cleaning state, the liquid transportation pumps 502 and 503 are stopped and almost simultaneously, the valves 507 and 520 are switched over to CLOSE.

(6) Cleaning Solution Circulating Type (Hydrostatic Pressure System Circulation Line and Cleaning Time Pressure Feed Type)

Figure 6:
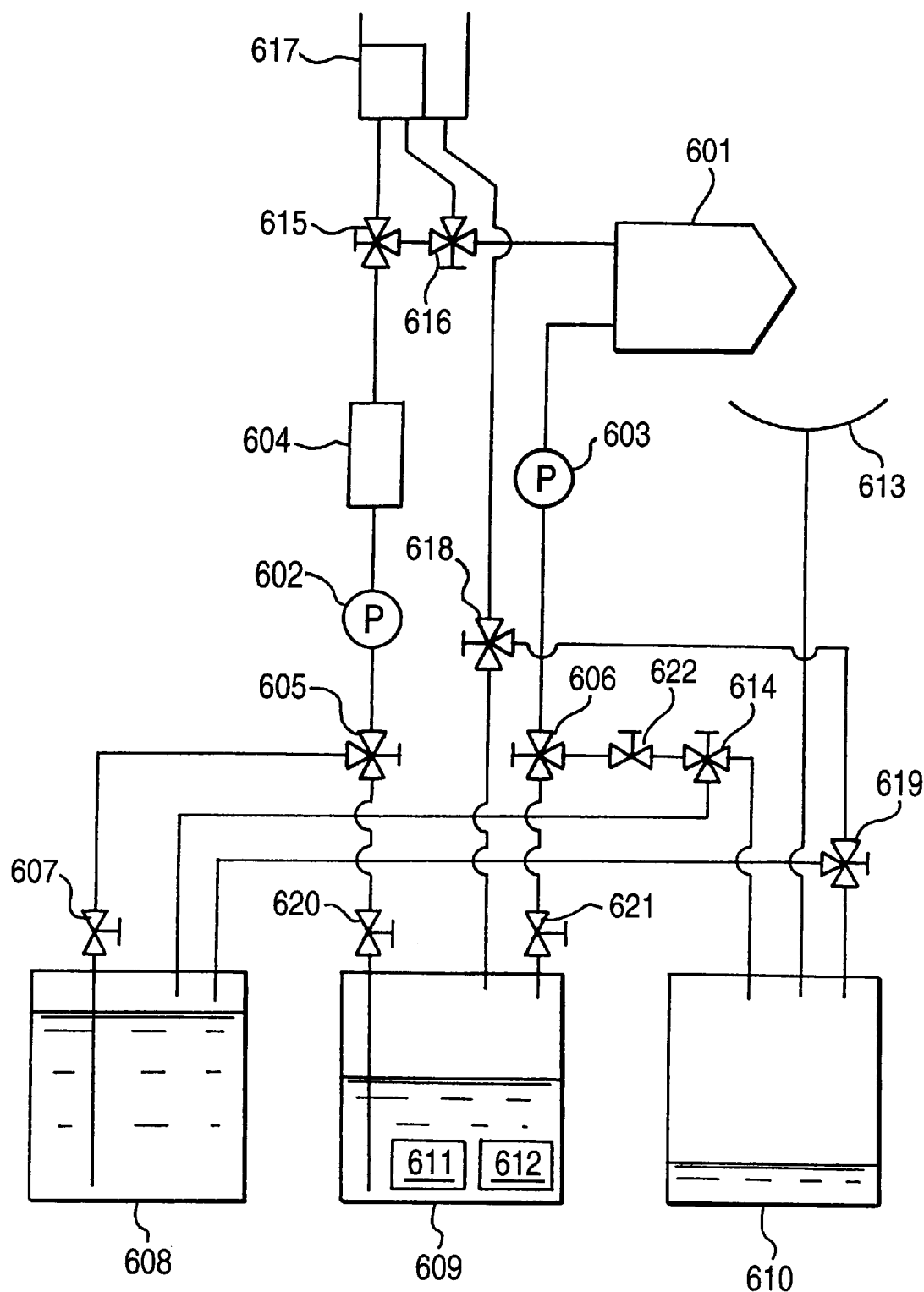
FIG. 6 is a view showing an example of cleaning solution circulating type employing a hydrostatic pressure system and a cleaning time pressure feed line according to the sixth embodiment of the present invention.

FIG. 6 is a view showing an example of cleaning solution circulating type employing hydrostatic pressure system and cleaning time pressure feed line according to the sixth embodiment of the present invention. In FIG. 6, 601 is a head, 602 and 603 are liquid transportation pumps in the feed side and the return side, respectively, 604 is ink concentration-controlling member, and 605, 606, 614, 615, 616, 618 and 619 are three-way valves. The three-way valve 605 is used for changing over the ink/cleaning solution in the feed side, the three-way valve 606 is used for the changeover to the ink tank 609 side/waste solution tank 610 side in the return side, the three-way valve 614 is used for changing over the place where the cleaning solution flows, and performs the changeover to the cleaning solution tank 608 side/waste solution tank 610 side, the three-way valves 615 and 616 are used for the bypass changeover to bypass the hydrostatic pressure tank 617 at the time of cleaning, and the three-way valves 618 and 619 are used for changing over the overflow solution to the ink tank 609 side/waste solution tank 610 side. The numerals 607, 620 and 622 are valves, 608 is a cleaning solution tank, 609 is an ink tank, 610 is a waste solution tank, 611 is stirring member, 612 is ink temperature-controlling member, 613 is a receiver pan and 617 is a hydrostatic pressure tank.

According to this embodiment, at the time of cleaning, the three-way valves 615 and 616 are switched over to bypass the hydrostatic pressure tank 617 and press-feed the head cleaning solution, whereby the cleaning is effectively performed. In this cleaning pattern, at the time of cleaning, the valve 607 is opened, the valve 620 is closed, the three-way valve 605 is opened to the cleaning solution tank 608 side, the three-way valves 606 and 618 are opened to the waste solution tank 610 side and the valve 621 is switched over to CLOSE. Thereafter, a cleaning solution is flown to the waste solution tank 610 side to clean the ink passages (between the three-way valve 605 and the head 601 and between the head 601 and the three-way valve 606) and the ejection part (electrode) of the head 601. The cleaning of the head 601 is performed by ejecting the cleaning solution to the receiver pan 613 from the head 601. This cleaning solution is discharged to the waste solution tank 610 (here, the valve 622 is always in the OPEN state).

At this time, the three-way valves 614 and 619 are still opened to the waste solution tank 610 side. At the timing when the cleaning solution passing through the three-way valves 614 and 619 becomes clean, the three-way valves 614 and 619 are switched over to the cleaning solution tank 608 side to circulate the cleaning solution. The cleaning solution is preferably always circulated except for the plate-making time.

Here, when the liquid transportation pumps 602 and 603 are elevated in the flow rate and the flow velocity, the cleaning effect can be enhanced.

Furthermore, when only the liquid transportation pump 602 is elevated in the ejection amount, the cleaning solution leaks out from the head ejection part 601 and the cleaning from the head ejection part can be effectively performed. The cleaning solution leaked out is discharged to the waste solution tank 610 through the receiver pan 613. This cleaning provides a higher effect if it is performed at the initiation and the completion of cleaning.

In stopping the apparatus from the above-described cleaning state, the liquid transportation pumps 602 and 603 are stopped and almost simultaneously, the valves 607 and 622 are switched over to CLOSE.

As such, in the ink jet method of ejecting an oil ink using electrostatic field, attachments adhering to the electrode and passage of the circulation line can be removed by changing over the ink to a cleaning solution at the time of cleaning the ink passage of the ink circulation line and therefore, this is indispensable for ensuring the performance of the electrostatic ink jet method.

The plate material (printing original plate) for use in the present invention is described below.

Examples of the printing original plate include metal plates such as a steel plate subjected to plating with aluminum or chromium. An aluminum plate subjected to graining or anodization and thereby favored with a surface having good water retentivity and high abrasion resistance is particularly preferred. Also, a plate material obtained by providing an image-receiving layer on a water-resistant support such as paper imparted with water resistance, plastic film or plastic-laminated paper, may be used and this plate material is more inexpensive. The thickness of the plate material is suitably from 100 to 300 $\mu$m and the thickness of the image-receiving layer provided thereon is suitably from 5 to 30 $\mu$m.

The image-receiving layer used may be a hydrophilic layer comprising an inorganic pigment and a binder or a layer which can be rendered hydrophilic by a desensitization treatment.

Examples of the inorganic pigment which can be used in the hydrophilic image-receiving layer include clay, silica, calcium carbonate, zinc oxide, aluminum oxide and barium sulfate. Examples of the binder which can be used include hydrophilic binders such as polyvinyl alcohol, starch, carboxymethyl cellulose, hydroxyethyl cellulose, casein, gelatin, polyacrylates, polyvinylpyrrolidone and polymethyl ether-maleic anhydride copolymers. If desired, a melamine-formalin resin, a urea-formalin resin or other cross-linking agent may also be added so as to impart water resistance.

Examples of the image-receiving layer which is used after a desensitization treatment include a layer using zinc oxide and a hydrophobic binder.

The zinc oxide used for use in the present invention may be any commercial product available as zinc oxide, zinc white, wet zinc white or activated zinc white, which are described, for example, in *Shinpan Ganryo Binran* (*Handbook of Pigments, New Edition*), compiled by Nippon Ganryo Gijutsu Kyokai, issued by Seibundo, page 319 (1968). That is, the zinc oxide includes those called a dry process such as French process (indirect process) and American process (direct process), and a wet process, according to the starting materials and the manufacturing method. Examples thereof include commercial products available from Seido Chemical Industry Co., Ltd., Sakai Chemical Industry Co., Ltd., Hakusui Chemical Industries, Ltd., The Honjo Chemical Corporation, Toho Zinc Co., Ltd., Mitsui Mining and Smelting Co., Ltd., and the like.

Specific examples of the resin used as a binder include styrene copolymers, methacrylate copolymers, acrylate copolymers, vinyl acetate copolymers, polyvinyl butyral, alkyd resins, epoxy resins, epoxy ester resins, polyester resins and polyurethane resins. These resins may be used individually or in combination of two or more thereof.

The content of the resin in the image-receiving layer is preferably, in terms of the weight ratio of resin/zinc oxide, from 9/91 to 20/80.

The desensitization of zinc oxide is performed by an ordinary method using a desensitizing solution and examples of conventionally known desensitizing solutions include a cyan compound-containing treating solution mainly comprising a ferrocyanate or a ferricyanate, a cyan-free treating solution mainly comprising an ammine cobalt complex, a phytic acid or a derivative thereof, or a guanidine derivative, a treating solution mainly comprising an inorganic or organic acid capable of forming a chelate with zinc ion, and a treating solution containing a water-soluble polymer.

Examples of the cyan compound-containing treating solution include those described in JP-B-44-9045 (the term "JP-B" as used herein means an "examined Japanese patent publication"), JP-B-46-39403, JP-A-52-76101, JP-A-57-107889 and JP-A-54-117201.

The surface opposite the image-receiving layer of the plate material preferably has a Beck smoothness of 150 to 700 (sec/10 ml). With this smoothness, the produced printing plate can be free of occurrence of slipping or sliding on the plate cylinder during the printing and good printing can be performed.

The Beck smoothness can be measured by a Beck smoothness tester. The beck smoothness tester is a tester where a test piece is pressed on a circular glass plate finished to a high smoothness and having a hole in the center under a constant pressure (1 kgf/cm$^2$ (9.8 N/cm$^2$)) and the time necessary for a constant amount (10 ml) of air to pass through between the glass surface and the test piece under reduced pressure is measured.

The oil ink for use in the present invention is described below.

The oil ink for use in the present invention is obtained by dispersing at least resin particles, which are solid at an ordinary temperature and are hydrophobic, in a nonaqueous solvent having an electric resistivity of $10^9$ $\Omega$cm or more and a dielectric constant of 3.5 or less.

The nonaqueous solvent having an electric resistivity of $10^9$ $\Omega$cm or more and a dielectric constant of 3.5 or less for use in the present invention is preferably a linear or branched aliphatic hydrocarbon, an alicyclic hydrocarbon, an aromatic hydrocarbon or a halogen substitution product of these hydrocarbons. Examples thereof include hexane, heptane, octane, isooctane, decane, isodecane, decalin, nonane, dodecane, isododecane, cyclohexane, cyclooctane, cyclodecane, benzene, toluene, xylene, mesitylene, Isoper C, Isoper E, Isoper G, Isoper H, Isoper L (Isoper: a trade name of Exxon Corp.), Shellsol 70, Shellsol 71 (Shellsol: a trade name of Shell Oil Corp.), Amsco OMS solvent, Amsco 460 solvent (Amsco: a trade name of American Mineral Spirits Co.), and silicone oil. These are used individually or in combination. The upper limit of the electric resistivity of the nonaqueous solvent is about $10^{16}$ $\Omega$cm and the lower limit of the dielectric constant is about 1.9.

The electric resistance of the nonaqueous solvent is specified to the above-described range because if the electric resistance is less than this range, resin particles or the like are not easily concentrated and a sufficiently long press life cannot be obtained. The dielectric constant is specified to the above-described range because if the dielectric constant exceeds this range, the electric field is relaxed due to polarization of the solvent and thereby, the ink is poorly ejected.

The resin particle dispersed in the nonaqueous solvent may be sufficient if it is a hydrophobic resin particle which is solid at a temperature of 35° C. or less and has high affinity for the nonaqueous solvent. However, the resin particle is preferably a resin (P) having a glass transition point of −5 to 110° C. or a softening point of 33 to 140° C., more preferably having a glass transition point of 10 to 100° C. or a softening point of 38 to 120° C., still more preferably having a glass transition point of 15 to 80° C. or a softening point of 38 to 100° C.

By using a resin having such a glass transition point or a softening point, the affinity between the surface of the image-receiving layer of the printing original plate and the resin particle increases and the bonding among resin particles is intensified on the printing original plate, so that the adhesion between the image area and the image-receiving layer is improved and the press life is also improved. If the glass transition point or softening point is lower or higher than the above-described range, the affinity between the surface of the image-receiving layer and the resin particle or the bonding force among resin particles may decrease.

The weight average molecular weight (Mw) of the resin (P) is from $1\times10^3$ to $1\times10^6$, preferably from $5\times10^3$ to $8\times10^5$, more preferably from $1\times10^4$ to $5\times10^5$.

Specific examples of the resin (P) include olefin polymers and copolymers (for example, polyethylene, polypropylene, polyisobutylene, ethylene-vinyl acetate copolymer, ethylene-acrylate copolymer, ethylene-methacrylate copolymer and ethylene-methacrylic acid copolymer), vinyl chloride polymers and copolymers (for example, polyvinyl chloride and vinyl chloride-vinyl acetate copolymer), vinylidene chloride copolymers, vinyl alkanoate polymers and copolymers, allyl alkanoate polymers and copolymers, polymers and copolymers of styrene and derivatives thereof (for example, butadiene-styrene copolymer, isoprene-styrene copolymer, styrene-methacrylate copolymer and styrene-acrylate copolymer), acrylonitrile copolymers, methacrylonitrile copolymers, alkyl vinyl ether copolymers, acrylic acid ester polymers and copolymers, methacrylic acid ester polymers and copolymers, itaconic acid diester polymers and copolymers, maleic acid anhydride copolymers, acrylamide copolymers, methacrylamide copolymers, phenolic resins, alkyd resins, polycarbonate resins, ketone resins, polyester resins, silicon resins, amide resins, hydroxyl group- or carboxyl group-modified polyester resins, butyral resins, polyvinyl acetal resins, urethane resins, rosin-type resins, hydrogenated rosin resins, petroleum resins, hydrogenated petroleum resins, maleic acid resins, terpene resins, hydrogenated terpene resins, chroman-indene resins, cyclic rubber-methacrylic acid ester copolymers, cyclic rubber-acrylic acid ester copolymers, copolymers containing a heterocyclic ring having no nitrogen atom (examples of the heterocyclic ring include furan ring, tetrahydrofuran ring, thiophene ring, dioxane ring, dioxofuran ring, lactone ring, benzofuran ring, benzothiophene ring and 1,3-dioxetane ring), and epoxy resins.

The content of resin particles dispersed in the oil ink for use in the present invention is preferably from 0.5 to 20 wt % based on the entire ink. If the content is less than this range, problems are liable to arise, for example, the ink can hardly have affinity for the surface of the printing original plate to fail in obtaining a good image or the press life is shortened. On the other hand, if the content exceeds the above-described range, uniform dispersion may not be easily obtained or non-uniform ink flow readily occurs in the ejection head to fail in attaining stable ink ejection.

The oil ink for use in the present invention preferably contains, together with the disperse resin particles, a coloring material as a coloration component so as to facilitate inspection of the printing plate after the plate-making.

The coloring material may be any coloring material as long as it is a pigment or a dye conventionally used in oil ink compositions or liquid developers for electrostatic photography.

For the pigments a pigment commonly used in the field of printing may be used irrespective of an inorganic pigment or an organic pigment. Specific examples thereof include carbon black, cadmium red, molybdenum red, chrome yellow, cadmium yellow, titanium yellow, chromium oxide, viridian, cobalt green, ultramarine blue, Prussian blue, cobalt blue, azo-type pigments, phthalocyanine-type pigments, quinacridone-type pigments, isoindolinone-type pigments, dioxazine-type pigments, threne-type pigments, perylene-type pigments, perinone-type pigments, thioindigo-type pigments, quinophthalone-type pigments and metal complex pigments These known pigments can be used without any particular limitation.

The dye is preferably an oil-soluble dye such as azo dye, metal complex salt dye, naphthol dye, anthraquinone dye, indigo dye, carbonium dye, quinoneimine dye, xanthene dye, aniline dye, quinoline dye, nitro dye, nitroso dye, benzoquinone dye, naphthoquinone dye, phthalocyanine dye and metallo-phthalocyanine dye.

These pigments and dyes may be used individually or in an appropriate combination, however, the content thereof is preferably from 0.01 to 5 wt % based on the entire ink.

The coloring material may be dispersed by itself as disperse particles in the nonaqueous solvent separately from the disperse resin particles or may be incorporated into the disperse resin particles. In the latter case, a pigment may be generally incorporated by a method of covering the pigment with the resin material of the disperse resin particle to form a resin-covered particle and a dye is generally incorporated by a method of coloring the surface part of the disperse resin particle to form a colored particle.

In the present invention, the resin particles including the colored particles dispersed in the nonaqueous solvent preferably have an average particle size of 0.05 to 5 μm, more preferably from 0.1 to 1.0 μm This particle size is determined by CAPA-500 (trade name, manufactured by Horiba Seisakusho Co., Ltd.).

The nonaqueous disperse resin particle for use in the present invention may be produced by a conventionally known mechanical grinding method or polymerization granulating method. Examples of the mechanical grinding method include a method where materials for forming resin particles are mixed, if desired, and through melting and kneading, directly ground into fine particles by a known grinder and the fine particles are dispersed using a dispersion polymer in combination by a wet dispersing machine (for example, ball mill, paint shaker, Kedy mill or Dyno mill), and a method where component materials for forming resin particles and a dispersion aid polymer (or covering polymer) are previously kneaded and the kneaded product is ground and then dispersed in the presence of a dispersion polymer. Specifically, a production process of coating materials or liquid developers for electrostatic photography may be utilized and this is described, for example, in Kenji Ueki (supervisor of translation), *Toryo no Ryudo to Ganryo Bunsan (Flow of Coating Materials and Dispersion of Pigments)*, Kyoritsu Shuppan (1971), Solomon, *Toryo no Kagaku (Science of Coatings)*, Hirokawa Shoten (1969), Yuji Harasaki, *Coating Kogaku (Coating Engineering)*, Asakura Shoten (1971), and Yuji Harasaki, *Coating no Kiso Kagaku (Basic Science of Coating)*, Maki Shoten (1977).

Examples of the polymerization granulating method include a conventionally known nonaqueous dispersion polymerization method and this is specifically described in publications such as Soichi Muroi (supervisor of compilation), *Cho-Biryushi Polymer no Saishin Gijutsu (Latest Technology of Ultrafine Polymers)*, Chapter 2, CMC Shuppan (1991), Koichi Nakamura, *Saikin no Denshi-*

*Shasin Genzo System to Toner Zairyo no Kaihatsu/Jitsuyoka (Recent Electrophotographic Developing Systems and Development and Practical Use of Toner Materials)*, Chapter 3, Nippon Kagaku Joho Co., Ltd. (1985), and K. E. J. Barrett, *Dispersion Polymerization in Organic Media*, John Wiley (1975).

In order to dispersion-stabilizing the disperse particles in a nonaqueous solvent, a dispersion polymer is usually used in combination. The dispersion polymer mainly comprises a repeating unit soluble in a nonaqueous solvent and preferably has an average molecular weight, in terms of a weight average molecular weight (Mw), of $1 \times 10^3$ to $1 \times 10^6$, more preferably from $5 \times 10^3$ to $5 \times 10^5$.

The preferred soluble repeating unit of the dispersion polymer for use in the present invention includes a polymerization component represented by the following formula (I):

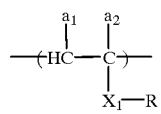

In formula (I), $X_1$ represents —COO—, —OCO— or —O—, R represents an alkyl or alkenyl group having from 10 to 32 carbon atoms, preferably an alkyl or alkenyl group having from 10 to 22 carbon atoms, which may be linear or branched but is preferably unsubstituted and which may have a substituent. Specific examples thereof include a decyl group, a dodecyl group, a tridecyl group, a tetradecyl group, a hexadecyl group, an octadecyl group, an eicosanyl group, a docosanyl group, a decenyl group, a dodecenyl group, a tridecenyl group, a hexadecenyl group, an octadecenyl group and a linolenyl group).

$a_1$ and $a_2$, which may be the same or different, each represents a hydrogen atom, a halogen atom (e.g., chlorine, bromine), a cyano group, an alkyl group having from 1 to 3 carbon atoms (e.g., methyl, ethyl, propyl), —COO—$Z_1$ or —CH$_2$COO—$Z_1$ (wherein $Z_1$ represents a hydrocarbon group having 22 or less carbon atoms, which may be substituted, such as alkyl group, alkenyl group, aralkyl group, alicyclic group and aryl group).

Among the hydrocarbon groups represented by $Z_1$, preferred hydrocarbon groups are an alkyl group having from 1 to 22 carbon atoms, which may be substituted, such as methyl group, ethyl group, propyl group, butyl group, hexyl group, heptyl group, octyl group, nonyl group, decyl group, dodecyl group, tridecyl group, tetradecyl group, hexadecyl group, octadecyl group, eicosanyl group, docosanyl group, 2-chloroethyl group, 2-bromoethyl group, 2-cyanoethyl group, 2-methoxycarbonylethyl group, 2-methoxyethyl group and 3-bromopropyl group; an alkenyl group having from 4 to 18 carbon atoms, which may be substituted, such as 2-methyl-1-propenyl group, 2-butenyl group, 2-pentenyl group, 3-methyl-2-pentenyl group, 1-pentenyl group, 1-hexenyl group, 2-hexenyl group, 4-methyl-2-hexenyl group, decenyl group, dodecenyl group, tridecenyl group, hexadecenyl group, octadecenyl group and linolenyl group; an aralkyl group having from 7 to 12 carbon atoms, which may be substituted, such as benzyl group, phenethyl group, 3-phenylpropyl group, naphthylmethyl group, 2-naphthylethyl group, chlorobenzyl group, bromobenzyl group, methylbenzyl group, ethylbenzyl group, methoxybenzyl group, dimethylbenzyl group and dimethoxybenzyl group; an alicyclic group having from 5 to 8 carbon atoms, which may be substituted, such as cyclohexyl group, 2-cyclohexylethyl group and 2-cyclopentylethyl group; and an aromatic group having from 6 to 12 carbon atoms, which may be substituted, such as phenyl group, naphthyl group, tolyl group, xylyl group, propylphenyl group, butylphenyl group, octylphenyl group, dodecylphenyl group, methoxyphenyl group, ethoxyphenyl group, butoxyphenyl group decyloxyphenyl group, chlorophenyl group, dichlorophenyl group, bromophenyl group, cyanophenyl group, acetylphenyl group, methoxycarbonyl-phenyl group, ethoxycarbonylphenyl group, butoxycarbonyl-phenyl group, acetamidophenyl group, propionamidophenyl group and dodecyloylamidophenyl group.

The dispersion polymer may contain another repeating unit as a copolymerization component together with the repeating unit represented by formula (I). The another copolymerization component may be any compound as long as it comprises a monomer copolymerizable with the monomer corresponding to the repeating unit represented by formula (I).

The percentage of the polymer component represented by formula (I) occupying in the dispersion polymer is preferably 50 wt % or more, more preferably 60 wt % or more.

Specific examples of the dispersion polymer include those described in JP-A-10-204354, JP-A-10-204356, JP-A-10-259336G, JP-A-10-306244, JP-A-10-316917 and JP-A-10-316920, and Resin (Q-1) for dispersion stabilization used in Examples. Also, commercially available products (for example, Solprene 1205, produced by Asahi Chemical Industry Co., Ltd.) may be used.

In the case of producing the particles of Resin (P) as a dispersion (latex) or the like, the dispersion polymer is preferably added in advance to the polymerization.

The amount of the dispersion polymer added is approximately from 1 to 50 wt % based on Resin (P) for particles.

The disperse resin particle and colored particle (or coloring material particle) in the oil ink for use in the present invention each is preferably an electroscopic particle bearing positive or negative charge.

The electroscopicity can be imparted to these particles by appropriately using a technique of developers for wet electrostatic photography. To speak specifically, the electroscopicity is imparted using an electroscopic material such as charge controlling agent, and other additives described, for example, in *Saikin no Denshi-Shasin Genzo System to Toner Zairyo no Kaihatsu/Jitsuyoka (Recent Electrophotographic Developing Systems and Development and Practical Use of Toner Materials)*, supra, pp. 139–148, *Denshi Shashin Gijutsu no Kiso to Oyo (Elementary Study and Application of Electrophotographic Technology)*, Denshi Shashin Gakkai (compiler), pp. 497–505, Corona Sha (1988), and Yuji Harasaki, *Denshi Shashin (Electrophotography)*, 16 (No. 2), page 44 (1977).

This is more specifically described, for example, in British Patents 893,429, 934,038 and 1,122,397, U.S. Pat. Nos. 3,900,412 and 4,606,989, JP-A-60-179751, JP-A-60-185963 and JP-A-2-13965.

The amount of such a charge controlling agent is preferably from 0.001 to 1.0 part by weight per 1,000 parts by weight of the dispersion medium as a carrier liquid. If desired, various additives may be further added and the upper limit of the total amount of these additives is determined by the electric resistance of the oil ink. More specifically, if the electric resistivity of the ink in the state where disperse particles are removed is less than $10^9$ Ωcm, an image with good continuous gradation may not be obtained. Therefore, the amounts of the additives are preferably controlled within this limit.

On construction example of the computer-to-cylinder type lithographic printing apparatus for use in practicing the lithographic printing process of the present invention is described below.

Figure 17:
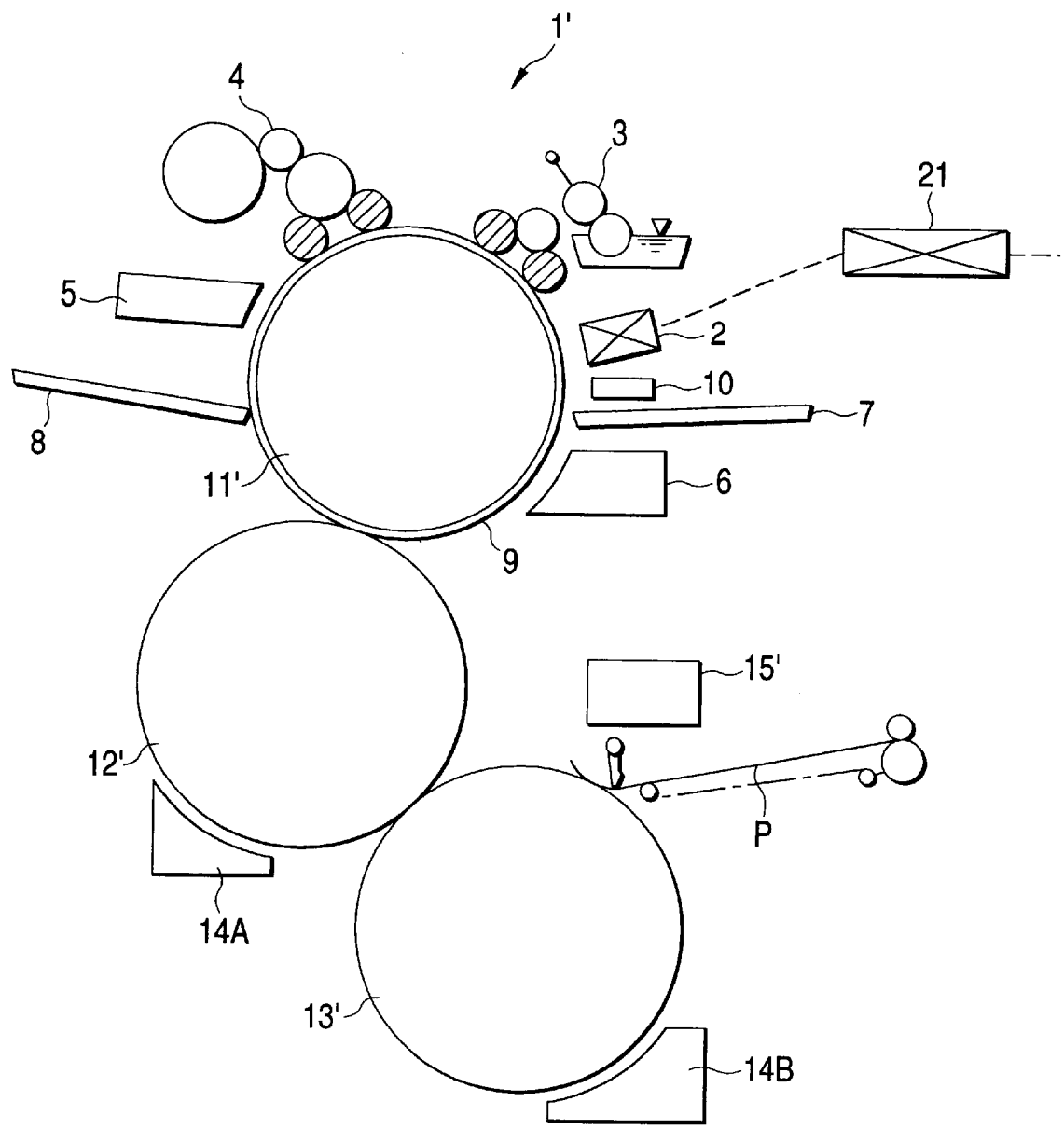
FIG. 17 is an entire construction view schematically showing one example of the computer-to-cylinder type lithographic printing apparatus for use in the present invention.
Figure 18:
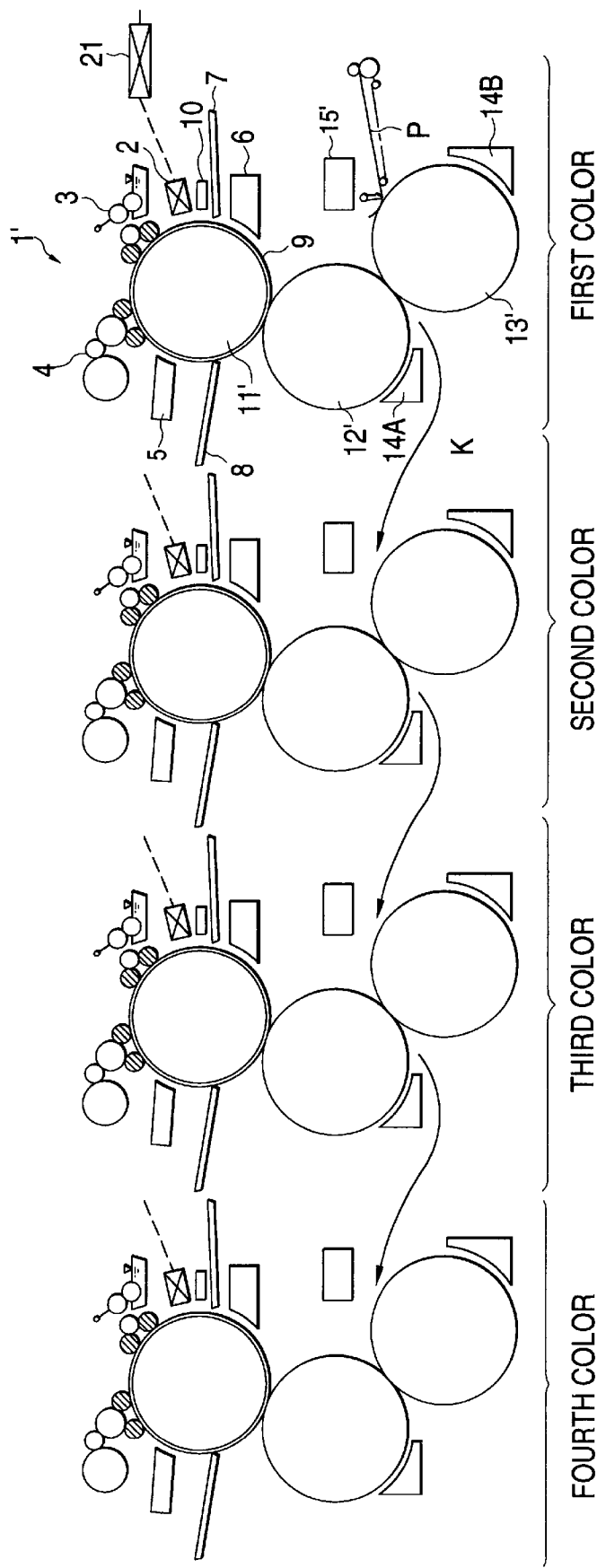
FIG. 18 is an entire construction view schematically showing a computer-to-cylinder type four-color one-side lithographic printing machine as one example of the multiple color printing machine for use in the present invention.

FIG. 17 is an entire construction view of a computer-to-cylinder type one-color one-side lithographic printing apparatus and FIG. 18 is an entire construction view of a computer-to-cylinder type four-color one-side lithographic printing apparatus according to the present invention.

The printing process according to the present invention is described below using the entire construction view of an on-press one-color one-side lithographic printing machine shown in FIG. 17. As shown in FIG. 17, the computer-to-cylinder type lithographic printing apparatus 1' (hereinafter sometimes simply referred to as a "printing apparatus") has one plate cylinder 11', one blanket cylinder 12' and one impression cylinder 13'. These cylinders are disposed such that at least at the time of performing lithographic printing, the blanket cylinder 12' for transfer is pressed against the plate cylinder 11' and the impression cylinder 13' for transferring the printing ink image transferred on the blanket cylinder to a printing paper P is pressed against the blanket cylinder 12'.

The plate cylinder 11' is usually made of a metal and the surface thereof is subjected to, for example, chromium plating so as to strengthen the abrasion resistance but the plate cylinder may have a heat insulating material on the surface thereof as described later. The plate cylinder 11' acts as a counter electrode of the ejection head electrode at the electrostatic ejection and therefore, is preferably earthed. In the case where the substrate of the plate material has high insulating property, an electrically conducting layer is preferably provided on the substrate and in this case, means for taking the earth from this electrically conducting layer to the plate cylinder is preferably provided. In the case of providing a heat insulating material on the plate cylinder, means for taking earth from the plate material is also provided to facilitate the drawing. In this case, known means having electrical conductivity, such as brush, leaf spring or roller may be used.

The printing apparatus 1' further has an ink jet recording device (ink jet drawing device) 2 which ejects an oil ink on the plate material 9 attached to the plate cylinder 11' in correspondence to the image data sent from an image data arithmetic and control part 21 and forms an image.

In the printing apparatus 1', a fountain solution feed device 3 of feeding a fountain solution to the hydrophilic part (non-image area) on the plate material 9 is provided. FIG. 17 shows an apparatus using a Morton water feed system which is a representative example of the fountain solution feed device 3, however, other known devices such as SHINFLO water feed system and continuous water feed system may be used for the fountain solution feed device 3.

The printing apparatus 1' further has a printing ink feed device 4 and a fixing device 5 for strengthening the oil ink image drawn on the plate material 9. If desired, a plate surface desensitizing device 6 may be provided for intensifying the hydrophilicity on the surface of the plate material 9.

The printing apparatus 1' further has plate material surface dust-removing member 10 of removing dusts present on the surface of the plate material before and/or during the drawing on the plate material. By this means, the ink can be effectively prevented from adhering to the plate material by the help of dusts invaded between the head and the plate material during the plate-making and thereby, good plate-making can be attained. For the dust-removing member, a known non-contact method such as suction removal, blowing removal or electrostatic removal, or a contact method by a brush, a roller or the like may be used. In the present invention, air suction, air blowing or a combination thereof is preferably used. In this case, an air pump usually used in a paper feed device can be used to this purpose.

In addition, an automatic plate feed device 7 for automatically feeding a plate material 9 to be used in printing, onto the plate cylinder 11' and an automatic plate discharge device 8 for automatically removing the plate material 9 from the plate cylinder 11' after the completion of printing may be provided. Examples of the printing machine having these devices known as auxiliary devices of a printing machine include Hamada VS34AR, B452A (manufactured by Hamada Insatsu Kikai K.K.), TOKOH 8000PFA (manufactured by Tokyo Koku Keiki K.K.), Ryobi 3200ACD, 3200PFA (manufactured by Ryobi Imagisk K.K.), AMSIS Multi5150FA (manufactured by Nippon AM K.K.), Oliver 266 EPZ (manufactured by Sakurai Graphic Systems K.K.) and Shinohara 66IV/IVP (manufactured by Shinohara Shoji K.K.). Furthermore, a blanket cleaning device 14A and an impression cylinder cleaning device 14B may also be provided. By using these devices 7, 8, 14A and 14B, the printing operation is more facilitated and the printing time can be shortened, as a result, the effect of the present invention can be more enhanced. In the vicinity of the impression cylinder 13', a paper dust generation-preventing device (paper dust-removing member) 15' may be provided so as to prevent paper dusts from adhering to the plate material. The paper dust generation-preventing device 15' may employ humidity control, suction by air or electrostatic force, or the like.

The image data arithmetic and control part 21 receives image data from an image scanner, a magnetic disc device, an image data transmission device or the like, performs color separation and at the same time, partitions and computes the separated data into an appropriate number of picture elements or an appropriate number of gradations. Furthermore, since the oil ink image is drawn as a dotted image using an ink jet ejection head 22 (which is described in detail later, see, FIG. 9) as an ejection head of the ink jet recording device 2, the halftone dot area factor is also computed.

In addition, as described later, the image data arithmetic and control part 21 controls the movement of the ink jet ejection head 22, the timing of ejecting the oil ink and if desired, the timing of operating the plate cylinder 11', the blanket cylinder 12', the impression cylinder 13' and the like.

The process of preparing a printing plate by the printing apparatus 1' is described below by referring to FIG. 17 and partially to FIG. 9.

A plate material 9 is attached to the plate cylinder 11' using an automatic plate feed device 7. At this time, the plate material is tightly fixed on the plate cylinder by a known mechanical method using a plate head/edge gripping device, an air suction device or the like, or by an electrostatic method, whereby the edge of plate can be prevented from fluttering to come into contact with the ink jet recording device 2 to case damages during the drawing. Furthermore, means of tightly contacting the plate material to the plate cylinder only in the periphery of the drawing position of the ink jet recording device may be provided and by actuating this at least at the time of performing the drawing, the plate material can also be prevented from contacting with the ink jet recording device. To speak specifically, for example, a method of disposing a presser roller upstream and downstream the drawing position of the plate cylinder may be used.

Also, means of preventing the plate edge from contacting with an ink feed roller during the process of fixing the plate may be provided and thereby, the staining of the plate surface can be prevented and the loss paper can be reduced. Specifically, a presser roller, a guide, electrostatic adsorption or the like is effective.

The image data from a magnetic disk device or the like is given to an image data arithmetic and control part 21 and according to the input image data, the image data arithmetic and control part 21 computes the position of ejecting an oil ink and the halftone dot area factor at that position. These computed data are once stored in a buffer. The image data arithmetic and control part 21 rotates the plate cylinder 11' and approximates the ejection head 22 to the position proximate to the plate cylinder 11' using a head-retreating or approximating device (ejection head-retreating or approximating member) 31. The ejection head 22 and the surface of the plate material 9 on the plate cylinder 11' are kept at a predetermined distance during the drawing using mechanical distance controlling member such as knock roller or under the control of the head-retreating or approximating device based on the signals from an optical distance detector. By this distance control, good plate-making can be attained without causing non-uniformity in the dot size due to floating of the plate material or particularly without causing any change in the dot size even when vibration is applied to the printing machine.

For the ejection head 22, a single channel head, a multi-channel head or a full line head may be used and the main scanning is performed by the rotation of the plate cylinder 11'. In the case of a multi-channel head or full line head having a plurality of ejection parts, the array direction of ejection parts is set to the axial direction of the plate cylinder 11'. Furthermore, in the case of a single channel head or a multi-channel head, the head 22 is moved in the axial direction of the plate cylinder by the image data arithmetic and control part 21 every each rotation of the plate cylinder 11' and an oil ink is ejected to the plate material 9 attached to the plate cylinder 11' at the ejection position and at the halftone dot area factor obtained by the computation. By this ejection, a halftone image is drawn on the plate material 9 by the oil ink according to the variable density of the printing original. This operation continues until an oil ink image of one color portion of the printing original is formed on the plate material 9 and a printing plate is finished.

On the other hand, in the case where the ejection head 22 is a full line head having almost the same length as the width of the plate cylinder, an oil ink image of one color portion of the printing original is formed on the plate material 9 by one rotation of the plate cylinder and a printing plate is finished. As such, the main scanning is performed by the rotation of the plate cylinder and therefore, the positional precision in the main scanning direction can be enhanced and high-speed drawing can be performed.

The ejection head 22 is then retreated to come apart from the position proximate to the plate cylinder 11' so as to protect the ejection head 22. At this time, only the ejection head 22 may be retreated but the ejection head 22 and the head sub scanning means 32 together, or the ejection head 22, the ink feed part 24 and the head sub-scanning means 32 all may be retreated. Together with the ejection head 22, the ink feed part 24 and the head sub-scanning means 32, the fixing device 5 and the dust-removing member 10 each may also be made capable of retreating by providing a retreating or approximating member and thereby, normal printing can also be performed.

This retreating or approximating member is operated to separate the ejection head at least 500 μm or more apart from the plate cylinder except for the drawing time. The retreating or approximating operation may be performed by a slide system or in a pendulum manner by fixing the head using an arm fixed to a certain axis and moving the arm around the axis. By retreating the head at the non-drawing time, the head can be protected from the physical breakage or contamination and can have a long life.

The formed oil ink image is strengthened under heating or the like in the fixing device 5. For fixing the ink, known means such as heat-fixing, solvent fixing and flash exposure fixing may be used. In the heat-fixing, hot air fixing by the irradiation of an infrared lamp, a halogen lamp or a xenon flash lamp or using a heater, or heat-roller fixing is generally employed. In this case, the fixing property can be effectively enhanced by using individually or in combination the means such as heating of the plate cylinder, preheating of the plate material, drawing while applying hot air, coating of the plate cylinder with a heat insulating material, and heating of only the plate material by separating the plate material from the plate cylinder only at the fixing. The flash fixing using a xenon lamp or the like is known as a fixing method of electrophotographic toner and this is advantageous in that the fixing can be performed within a short time. In the solvent fixing, a solvent capable of dissolving the resin components in the ink, such as methanol or ethyl acetate, is sprayed and excess solvent vapor is recovered.

At least in the process from the formation of an oil ink image by the ejection head 22 until the fixing by the fixing device 5, the fountain solution feed device 3, the printing ink feed device 4 and the blanket cylinder 12' are preferably kept not to come into contact with the plate material 9 on the plate cylinder.

The printing process after the formation of the printing plate is performed in the same manner as in a known lithographic printing process. More specifically, a printing ink and a fountain solution are given to the plate material 9 having drawn thereon an oil ink image to form a printing image, the printing ink image is transferred to a blanket cylinder 12' rotating together with the plate cylinder 11' and subsequently, the printing ink image on the blanket cylinder 12' is transferred to a printing paper sheet P passing through between the blanket cylinder 12' and the impression cylinder 13', thereby performing printing of one color portion. After the completion of printing, the plate material 9 is removed from the plate cylinder 11' by the automatic plate discharge device 8 and the blanket on the blanket cylinder 12' is cleaned by the blanket cleaning device 14A to provide a state ready for next printing.

The ink jet drawing device 2 used in the printing apparatus 1' is the same as described above with respect to the plate-making apparatus.

In the computer-to-cylinder type lithographic printing apparatus 1', the image data arithmetic and control part 21 computes the input image data and moves the head using a head-retreating or approximating device 31 or head sub-scanning means 32, as described above, and additionally takes in the timing pulse from an encoder 30 disposed in the plate cylinder and drives the head according to the timing pulse. By this, the positional precision in the sub-scanning direction is enhanced. The positional precision in the sub-scanning direction at the time of performing the drawing by the ink jet recording device can also be enhanced by driving the plate cylinder using high-precision driving means different from the driving means used at the printing. In this case, it is preferred to mechanically separate the driving means from the blanket Cylinder, the impression cylinder and others and drive only the plate cylinder. To speak more specifically, for example, a method of reducing the output from a high-precision motor by a high-precision gear, a steel belt or the like and driving only the plate cylinder may be used. In performing a high-quality drawing, these means are used individually or in combination.

The ejection head used is the same as described above with respect to the plate-making apparatus except that the drum 11 is replaced by a plate cylinder 11.

A computer-to-cylinder type multicolor one-side lithographic printing apparatus, which is a specific example of the present invention, is described below.

FIG. 18 shows an entire construction example of a computer-to-cylinder type four-color one-side lithographic cut sheet printing apparatus. As shown in FIG. 18 the four-color one-side lithographic cut sheet printing apparatus fundamentally has a structure such that the plate cylinder 11', the blanket cylinder 12' and impression cylinder 13' of a one-color one-side printing apparatus shown in FIG. 17 each is disposed in four units and the printing is performed on the same surface of a printing paper sheet P. Although not shown in the figure, the delivery of the printing paper sheet between adjacent impression cylinders, shown by K in the figure, is performed using a known cylinder delivery system or the like. As easily understood from the example of FIG. 18, other multicolor one-side printing apparatuses fundamentally have a structure such that the plate cylinder 11', the blanket cylinder 12' and impression cylinder 13' of a one-color one-side printing apparatus each is disposed in multiple units and the printing is performed on the same surface of a printing paper sheet P, though these are not described in detail here. In the case of manufacturing only one color portion plate on the plate cylinder, the plate cylinder and the blanket cylinder each is disposed in the number of units corresponding to the number of colors used for the printing (such a printing apparatus is called a unit-type printing apparatus). On the other hand, in the case of practicing the present invention by a common impression cylinder-type printing apparatus of commonly using one impression cylinder having a diameter as large as integral times the diameter of the plate cylinder while having the plate cylinder and the blanket cylinder each in the number of units corresponding to the multiple color portions, the printing apparatus may have a structure such that the plate cylinder and the blanket cylinder each in the number of units corresponding to the multiple color portions to be printed commonly use one impression cylinder or such that a plurality of structures of commonly using one impression cylinder by the plate cylinder and the blanket cylinder each in the number of units corresponding to multiple color portions are provided and the total number of each of the plate cylinder and the blanket cylinder corresponds to the number of color portions printed. In this case, the delivery of the printing paper sheet between adjacent common impression cylinders may be performed by the above-described known cylinder delivery system.

In the case of manufacturing plates of multiple colors on a plate cylinder, the plate cylinder and the blanket cylinder each must be provided in the number of units corresponding to the value obtained by dividing the number of colors printed by the number of plates on one plate cylinder. For example, in the case of manufacturing plate materials of two color portions on a plate cylinder, one-side four-color printing can be performed by a printing apparatus having two plate cylinders and two blanket cylinders. In this case, the diameter of the impression cylinder is the same as the size of the plate cylinder of one color portion, means for holding a printing paper sheet until the completion of printing of necessary color portions is provided to the impression cylinder, if desired, and the delivery of the printing paper sheet between impression cylinders is performed using a known cylinder delivery system. In the case of the above-described press having two plate cylinders having formed thereon plate materials of two color portions and having two blanket cylinders, one impression cylinder rotates twice while holding a printing paper sheet to perform two-color printing, the printing paper sheet is delivered between impression cylinders, and the other impression cylinder rotates twice while holding the printing paper sheet to perform two-color printing, thereby completing four-color printing. The number of impression cylinders may be the same as the number of plate cylinders but some plate cylinders and some blanket cylinders may commonly use one impression cylinder.

In the case of practicing the present invention as a computer-to-cylinder type multicolor two-side lithographic out sheet printing apparatus, the printing apparatus has a structure such that known printing paper-reversing means is provided in at least one space between adjacent impression cylinders of the above-described unit-type printing apparatus, a structure such that a plurality of common impression cylinder-type printing apparatuses are disposed and known printing paper-reversing means is provided in at least one space between adjacent impression cylinders, or a structure such that the plate cylinder 11' and the blanket cylinder 12' of a one-color one-side printing apparatus shown in FIG. 17 are disposed in multiple units to perform the printing on both surfaces of the printing paper sheet P. In the structure shown in FIG. 17, when only a plate of one color portion is manufactured on the plate cylinder, the plate cylinder and the blanket cylinder are provided in the number of units corresponding to the number of colors necessary for the printing on both surfaces of a printing paper sheet. On the other hand, when plates of multiple colors are manufactured on the plate cylinder as described above, the numbers of plate cylinders, blanket cylinders and impression cylinders can be reduced. Furthermore, when one impression cylinder is commonly used by some plate cylinders and some blanket cylinders, the number of impression cylinders can be more reduced. If desired, means of holding the printing paper sheet until the completion of printing of necessary color portions is provided on the impression cylinder. This can be easily understood from the above-described example of a computer-to-cylinder type multicolor one-side lithographic printing machine and therefore, details thereon are omitted here.

As such, an example of a cut sheet printing apparatus is described as a practical embodiment of the computer-to-cylinder type multicolor lithographic printing apparatus of the present invention. In the case of practicing the present invention as a computer-to-cylinder type multicolor WEB (rolled paper) lithographic printing apparatus, the above-described unit type and common impression cylinder type can be suitably used. Furthermore, in the case of practicing the present invention as a computer-to-cylinder type multicolor WEB two-side printing apparatus, this can be achieved in both the unit type and the common impression cylinder type by having a structure such that known WEB-reversing means is provided in at least one space between adjacent impression cylinders or a structure such that a plurality of such means are provided so as to perform the printing on both surface of the printing paper sheet P. The computer-to-cylinder type multicolor WEB two-side printing apparatus is most suitably a BB (blanket-to-blanket) type printing apparatus where a structure of having a plate cylinder (no impression cylinder) of one color portion and a blanket cylinder for performing the printing on one surface of WEB, a plate cylinder of one color portion and a blanket cylinder (no impression cylinder) for performing the printing on another surface and press-contacting the blanket cylinders with each other at the printing, is provided in the number of units corresponding to the number of colors and the WEB is passed through between press-contacted blankets at the printing, thereby achieving multicolor two-side printing.

In another example of the computer-to-cylinder type lithographic printing apparatus, two plate cylinders are provided per one blanket cylinder and while performing the printing by one plate cylinder, the drawing may be performed on another plate cylinder. In this case, the driving of the plate cylinder under drawing is preferably made independent from the blanket by mechanical means. By constructing as such, the drawing can be performed without stopping the printing machine. Incidentally, as easily understood, this computer-to-cylinder type lithographic printing apparatus can be applied to the computer-to-cylinder type multicolor one-side lithographic printing apparatus or computer-to-cylinder type multicolor two-side lithographic printing apparatus.

EXAMPLES

The present invention will be illustrated in greater detail by referring to the following Examples, but the invention should not be construed as being limited thereto.

A production example of Resin Particle (FL) for ink is described below.

Production Example 1 of Resin Particle (PL-1)

A mixed solution containing 10 g of Resin (Q-1) for dispersion stabilization having a structure shown below, 100 g of vinyl acetate and 384 g of Isoper H was heated to a temperature of 70° C. while stirring in a nitrogen stream. Thereto, 0.8 of 2,2'-azobis(isovaleronitrile) (herein-after simply referred to as "A.I.V.N.") was added as a polymerization initiator and reacted for 3 hours. 20 Minutes after the addition of the initiator, the solution turned to milky white and the reaction temperature was elevated to 88° C. Thereto, 0.5 g of the same initiator was further added and reacted for 2 hours. Thereafter, the temperature was elevated to 100° C., the reaction solution was stirred for 2 hours, and unreacted vinyl acetate was removed by distillation. The residue was cooled and passed through a 200-mesh nylon cloth. The obtained white dispersion was a latex having a polymerization percentage of 90%, an average particle size of 0.23 µm and good monodispersity. The particle size was measured by CAPA-500 (manufactured by Horiba Seisakusho K.K.).

Resin (Q-1) for Dispersion Stabilization:

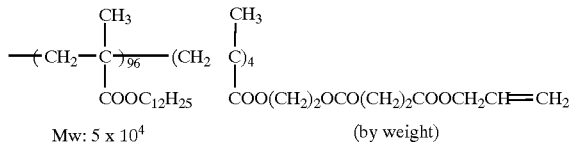

Mw: 5 x 10$^4$    (by weight)

A part of this white dispersion was centrifuged (revolution number: 1×10$^4$ rpm, revolution time: 60 minutes) and the precipitated resin particle portion was collected and dried. The resin particle portion had a weight average molecular weight (Mw, GPC value in terms of polystyrene) of 2×10$^5$ and a glass transition point (Tg) of 38° C.

Example 1

An oil ink was prepared.

Preparation of Oil Ink (IK-1)

Into a paint shaker (manufactured by Toyo Seiki K.K.), 10 g of a dodecyl methacrylate/acrylic acid copolymer (copolymerization ratio: 95/5 by weight), 10 g of nigrosine and 30 g of Shellsol 71 were charged together with glass beads and dispersed for 4 hours to obtain a fine nigrosine dispersion.

Then, 60 g (as solid contents) of Resin Particle (PL-1) produced in Preparation Example 1 of Resin Particle for Ink, 2.5 g of the nigrosine dispersion prepared above, 15 g of FOC-1400 (tetradecyl alcohol, produced by Nissan Chemical Industries Co., Ltd.) and 0.08 g of an octadecene-half maleic acid octadecylamide copolymer were diluted with 1 liter of Isoper G to prepare a black oil ink.

Thereafter, 2 liter of the thus-prepared Oil Ink (IK-1) was filled in an ink tank of an ink jet drawing device 2 of a plate-making apparatus (see, FIG. 7 and FIG. 9). The ejection head used here was a 900 dpi multi-channel head of 64 channels shown in FIG. 10. In the ink tank, an immersion heater and a stirring blade were provided as the ink temperature-controlling member and by setting the ink temperature to 30° C., the temperature was controlled using a thermostat while rotating the stirring blade at 30 rpm. The stirring blade used here was also served as stirring member for preventing precipitation and coagulation. A part of the ink passage was made transparent, and an LED light-emitting device and a light-detecting device were disposed to sandwich the transparent portion. Based on the output signal therefrom, the concentration was controlled by charging a diluting solution (Isoper G) for ink or a concentrated ink (Ink (IK-1) adjusted to a 2-fold solid concentration).

The plate-making was performed after removing a cleaning solution at the initiation of the plate-making from the ink circulation line where the cleaning solution was filled by the pump pressure circulating system according to the first embodiment of the present invention as shown in FIG. 1 until the plate-making.

A 0.12 mm-thick aluminum plate subjected to graining and anodization was used as the plate material and fixed by mechanical means provided on the drum of a plate-making apparatus while gripping the head and edge of the plate. After removing dusts on the surface of the plate material by air pump suction, the ejection head was approximated to the plate material until the drawing position. Then, the image data to be drawn were transmitted to the image data arithmetic and control part and the 64-channel ejection head was moved while rotating the drum, thereby ejecting an oil ink onto the aluminum plate to form an image. At this time, the tip width of the ejection electrode of the ink jet head was 10 µm and the distance between the head and the plate material was controlled to 1 mm by the output from an optical gap detecting device. A voltage of 2.5 KV was always applied as a bias voltage and at the time of performing the ejection, a pulse voltage of 500 V was superimposed. The pulse voltage was changed through 256 stages in the range from 0.2 to 0.05 msec so as to perform the drawing while changing the dot area. As a result, good plate-making was attained, where drawing failure due to dust was not observed at all and the image was completely free of deterioration due to change in the dot size or the like even when the ambient temperature was changed or the number of processed plates increased.

The image was further firmly fixed by the heating using a xenon flash fixing device (manufactured by Ushio Denki, emission intensity: 200 J/pulse), thereby manufacturing a printing plate. The ink jet drawing device with the sub-scanning means was retreated 50 mm from the position proximate to the drum so as to protect the ink jet head. Thereafter, the printing plate was taken out from the plate-making apparatus and attached to the plate cylinder of Oliver 266 EPZ press and then, the printing was performed.

The printed matters obtained had a very clear image free of slipping or thinning of the printed image even after 10,000 sheets were continuously printed.

After the completion of plate-making, the ink was removed from the ink circulation line and the cleaning solution was again filled by the pump pressure circulating system shown in FIG. 1. Furthermore, Isoper G was fed to the head for 10 minutes to drop Isoper G from the head opening and thereby clean the head and then, the head was stored in a cover filled with a vapor of Isoper G, as a result, a printing plate capable of giving good printed matters could be obtained without requiring any maintenance operation for 6 months.

Example 2

In an apparatus shown in FIG. 8, a 600 dpi full line ink jet head of the type shown in FIG. 12 was disposed. A pump was used for the circulation of ink and an ink reservoir was provided between this pump and the ink inflow passage of the ejection head and between the ink recovery passage of the ejection head and the ink tank. The ink was circulated using the difference in the hydrostatic pressure therebetween. A heater and the above-described pump were used as the ink temperature-controlling member and the ink temperature set to 35° C. was controlled by a thermostat. The circulation pump used here was served also as the stirring member for preventing the precipitation and coagulation. An electrical conductivity-measuring device was disposed on the ink passage and based on the output signal therefrom, the ink concentration was controlled by diluting the ink or charging a concentrated ink. The aluminum plate prepared above was fixed as the plate material in the same manner to the drum of a plate-making apparatus. After removing dusts on the surface of the plate material using a nylon-made rotary brush, the image data to be drawn was transmitted to the image data arithmetic and control part and while transporting the plate material by capstan rollers, the full line head was allowed to perform the drawing by ejecting an oil ink onto the aluminum plate to form an image.

The plate-making was performed after removing a cleaning solution at the initiation of the plate-making from the ink circulation line where the cleaning solution was filled according to the third embodiment of the present invention as shown in FIG. 3 until the plate-making.

As a result, good plate-making could be attained, where drawing failure and the like due to dust was not observed at all and even when the ambient temperature was changed or the number of processed plates increased, the image was completely free from deterioration due to change in the dot size and the like. The image was firmly fixed by the heating (pressure: 3 kgf/cm$^2$ (29.4 N/cm$^2$)) using a heat roller (Teflon seal silicon rubber roller self-containing a halogen lamp of 300 W) fixing device.

Using the manufactured plate, printing was performed in the same manner as in Example 1, as a result, a very clear image free of slipping or thinning of the printed image could be obtained even after 10,000 sheets were continuously printed. After the completion of plate-making, the ink was removed from the ink circulation line and a cleaning solution was again filled as shown in FIG. 3. Furthermore, Isoper G was circulated to the head and then a non-woven fabric impregnated with Isoper G was contacted with the head tip to perform the cleaning, as a result, a printing plate capable of giving good printed matters could be manufactured without requiring any maintenance operation for 6 months.

The drawing and printing were performed in the same manner except for using a 600 dpi full line ink jet head of the type shown in FIG. 14 and FIG. 16 in place of the ink jet head of the type shown in FIG. 12, as a result, good results were obtained similarly to the above.

Example 3

A cleaning solution was circulated to the ink circulation line before the plate-making as shown in FIG. 4 according to the fourth embodiment of the present invention, but the cleaning solution was recovered to the cleaning solution tank at the initiation of plate-making and the plate making was performed by feeding the ink to the ink circulation line. Furthermore, an operation was performed in the same manner as in Example 1 except that a plate material having provided on the surface thereof an image-receiving layer capable of hydrophilizing by a desensitization treatment, described below, was used in place of the aluminum place of Example 1, the non-image area after the preparation of the printing plate was hydrophilized using a plate surface-desensitizing device, the electrically conducting layer of the plate material was earthed by the contact with an electrically conducting plate spring (made of phosphor bronze) at the time of drawing, and the fixing was performed by blowing hot air to the plate material.

A wood-free paper having a basis weight of 100 g/m$^2$ was used as the substrate. On both surfaces of the substrate, a polyethylene film was laminated to a thickness of 20 μm to render the surfaces water-resistant and on this paper support, a coating material for the electrically conducting layer prepared as follows to have a composition shown below was coated to have a dry coated amount of 10 g/m$^2$. Thereon, Dispersion Solution A was further coated to have a dry coated weight of 15 g/m$^2$ thereby providing an image-receiving layer. Thus, the plate material was prepared.

Coating Material for Electrically Conducting Layer 5.4 Parts of carbon black (30% water solution), 54.6 parts of clay (50% water solution), 36 parts of SBR latex (solid content: 50%, Tg: 25° C.) and 4 parts of melamine resin (Sumirez Resin SR-613, solid content: 80%) were mixed and water was added to make a total solid content of 25%, thereby preparing the coating material.

Dispersion Solution A

A mixture containing 100 g of dry zinc oxide, 3 g of Binder Resin (B-1) having a structure shown below, 17 g of Binder Resin (B-2) having a structure shown below, 0.15 g of benzoic acid and 155 g of toluene was dispersed using a wet dispersing machine homogenizer (manufactured by Nippon Seiki K.K.) at a revolution number of 6,000 rpm for 8 minutes.

Binder Resin (B-1)

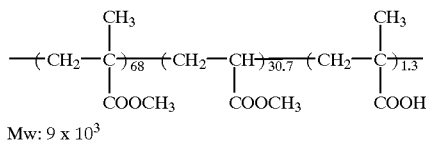

Mw: 9 x 10$^3$

-continued

Binder Resin (B-2)

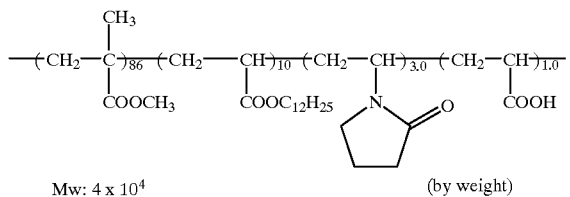

Mw: 4 x 10⁴ (by weight)

At the time of performing the fixing by blowing hot air to the plate material, blister was generated. Accordingly, the fixing was performed by gradually and continuously elevating the supply power to the heater used for the blowing of hot hair or by gradually and continuously reducing the rotation speed of the drum from high to low while not changing the supply power. As a result, blister was not generated and the printed matter obtained by the printing using the thus-obtained printing plate had a very clear image free of slipping or thinning of the printed image even after 5,000 sheets were continuously printed.

Example 4

2 Liter of Oil Ink (IK-1) prepared above was filled in an ink jet recording device of a computer-to-cylinder type lithographic printing apparatus (see, FIG. 17 and FIG. 9). The ejection head used here was a 900 dpi multi-channel head of 64 channels shown in FIG. 10. in the ink tank, an immersion heater and a stirring blade were provided as the ink temperature-controlling member and by setting the ink temperature to 30° C., the temperature was controlled using a thermostat while rotating the stirring blade at 30 rpm. The stirring blade used here was also served as stirring member for preventing precipitation and coagulation. A part of the ink passage was made transparent, and an LED light-emitting device and a light-detecting device were disposed to sandwich the transparent portion. Based on the output signal therefrom, the concentration was controlled by charging a diluting solution (Isoper G) for ink or a concentrated ink (Ink (IK-1) adjusted to a 2-fold solid concentration).

The plate-making was performed after removing a cleaning solution at the initiation of the plate-making from the ink circulation line where the cleaning solution was filled by the pump pressure circulating system according to the first embodiment of the present invention as shown in FIG. 1 until the plate-making.

A 0.12 mm-thick aluminum plate subjected to graining and anodization was used as the plate material and fixed to the plate cylinder by a mechanical device provided thereon while gripping the head and edge of the plate. The fountain solution feed device, the printing ink feed device and the blanket cylinder were kept apart not to come into contact with the plate material and after removing dusts on the surface of the plate material by air pump suction, the ejection head was approximated to the plate material until the drawing position. Then, the image data to be printed were transmitted to the image data arithmetic and control part and the 64-channel ejection head was moved while rotating the plate cylinder, thereby ejecting an oil ink onto the aluminum plate to form an image. At this time, the tip width of the ejection electrode of the ink jet head was 10 μm and the distance between the head and the plate material was controlled to 1 mm at all times according to the output from an optical gap detecting device. A voltage of 2.5 KV was always applied as a bias voltage and at the time of performing the ejection, a pulse voltage of 500 V was superimposed. The pulse voltage was changed through 256 stages in the range from 0.2 to 0.05 msec so as to perform the drawing while changing the dot area. As a result, good plate-making was attained, where drawing failure due to dust was not observed at all and the image was completely free of deterioration due to change in the dot size or the like even when the ambient temperature was changed or the number of processed plates increased.

The image was further firmly fixed by the heating using a xenon flash fixing device (manufactured by Ushio Denki, emission intensity: 200 J/pulse), thereby manufacturing a printing plate. The ink jet drawing device with the sub-scanning means was retreated 50 mm from the position proximate to the plate cylinder so as to protect the ink jet head. Thereafter, printing was performed on a coated printing paper in the same manner as above by a normal lithographic printing process. That is, a printing ink and a fountain solution were given to form a printing image, this printing ink image was transferred onto a blanket cylinder rotating together with the plate cylinder and the printing ink image on the blanket cylinder was transferred to the coated printing paper passing through between the blanket cylinder and the impression cylinder.

The printed matters obtained had a very clear image free of slipping or thinning of the printed image even after 10,000 sheets were continuously printed.

After the completion of plate-making, the ink was removed from the ink circulation line and the cleaning solution was again filled by the pump pressure circulating system shown in FIG. 1. Furthermore, Isoper G was fed to the head for 10 minutes to drop Isoper G from the head opening and thereby clean the head and then, the head was stored in a cover filled with a vapor of Isoper G, as a result, a printing plate capable of giving good printed matters could be obtained without requiring any maintenance operation for 6 months.

Example 5

A circulation pump was used as the stirring member and a 600 dpi full line ink jet head of the type shown in FIG. 12 was disposed. A pump was used here and an ink reservoir was provided between this pump and the ink inflow passage of the ejection head and between the ink recovery passage of the ejection head and the ink tank. The ink was circulated using the difference in the hydrostatic pressure therebetween. A heater and the above-described pump were used as the ink temperature-controlling member and the ink temperature set to 35° C. was controlled by a thermostat. The circulation pump used here was served also as the stirring member for preventing the precipitation and coagulation. An electrical conductivity-measuring device was disposed on the ink passage and based on the output signal therefrom, the ink concentration was controlled by diluting the ink or charging a concentrated ink. The aluminum plate described above was attached as the plate material to the plate cylinder of a lithographic printing apparatus in the same manner. After removing dusts on the surface of the plate material using a nylon-made rotary brush, the image data to be printed was transmitted to the image data arithmetic and control part and while transporting the plate cylinder, the full line head was allowed to perform the drawing by ejecting an oil ink onto the aluminum plate to form an image.

The plate-making was performed after removing a cleaning solution at the initiation of the plate-making from the ink circulation line where the cleaning solution was filled according to the third embodiment of the present invention as shown in FIG. 3 until the plate-making.

As a result, good plate-making could be attained, where drawing failure and the like due to dust was not observed at all and even when the ambient temperature was changed or the number of processed plates increased, the image was completely free of deterioration due to change in the dot size and the like. Subsequently, the image was firmly fixed by the heating using a heat roller fixing device (produced by Hitachi Kinzoku K.K., power: 1.2 kW). Thus, the plate material was prepared.

Using the manufactured plate, printing was performed, as a result, a very clear image free of slipping or thinning of the printed image could be obtained even after 10,000 sheets were continuously printed. After the completion of plate-making, the ink was removed from the ink circulation line and the cleaning solution was again filled as shown in FIG. 3. Furthermore, Isoper G was circulated to the head and then the head was cleaned by bringing a non-woven fabric impregnated with Isoper G into contact with the head tip. As a result, good printed matters could be obtained without requiring any maintenance operation for 6 months.

The drawing and printing were performed in the same manner except for using a 600 dpi full line ink jet head of the type shown in FIG. 14 and FIG. 16 in place of the ink jet head of the type shown in FIG. 12, as a result, good results were obtained similarly to the above.

Example 6

A full line head shown in FIG. 14 was used as the ejection head for the ink jet recording device of a computer-to-cylinder type four-color one-side lithographic printing apparatus (see, FIG. 18) and the gap was adjusted (gap: 0.8 mm) by a Teflon-made knock roller.

A cleaning solution was circulated to the ink circulation line before the plate-making as shown in FIG. 4 according to the fourth embodiment of the present invention, but the cleaning solution was recovered to the cleaning solution tank at the initiation of plate-making and the plate making was performed by feeding the ink to the ink circulation line. Other than this, the same operation was performed as in Example 1 except that supply of a concentrated ink to the ink tank according to the number of plates drawn was performed as the ink concentration-controlling member. By this operation, 5,000 plates were manufactured and these were completely free of drawing failure due to dust and not affected by the change in the ambient temperature at all. The dot size was slightly changed by the increase of the plates manufactured but this was within the range of causing any effect. The manufactured plate was subjected to flash fixing in the same manner as above and further to fixing by the irradiation of a halogen lamp (QIR manufactured by Ushio Denki K.K., power: 1.5 kW) and by the spraying of ethyl acetate.

After the plate-making, the ink was recovered from the ink circulation line and the cleaning solution was again circulated as shown in FIG. 4, as a result, good printing plates could be manufactured without requiring any maintenance operation for 12 months.

The halogen lamp was irradiated to perform the heating at a plate surface temperature of 95° C. for 20 seconds. The ethyl acetate was sprayed to a spray amount of 1 g/m². As a result, even after 10,000 sheets were continuously printed, a very clear full color printed matter free of slipping or thinning of the printed image could be obtained. Particularly, in the fixing using a heat roll or a halogen lamp, the fixing time could be greatly shortened by winding a heat insulating material (PET film) around the plate cylinder. In this case, the aluminum substrate was earthed by the contact with an electrically conducting brush (SANDERON, manufactured by Tsuchiya, resistance: about $10^{-1}$ Ωcm).

Example 7

An operation was performed in the same manner as in Example 4 except that a paper plate material having provided on the surface thereof a hydrophilic image-receiving layer described below was used in place of the aluminum plate of Example 4 and the plate-making was performed by removing a cleaning solution at the initiation of plate-making from the ink circulation line where the cleaning solution was circulated as shown in FIG. 6 according to the sixth embodiment of the present invention until the plate-making.

A wood-free paper having a basis weight of 100 g/m² was used as the substrate. On both surfaces of the substrate, a water-resistant layer mainly comprising kaolin and resin components of polyvinyl alcohol, SBR latex and melamine resin was provided and on the thus-obtained paper support, Dispersion Solution A prepared as follows to have a composition shown below was coated to a dry coated amount of 6 g/m², thereby providing an image-receiving layer. Thus, the paper plate material was prepared.

Dispersion Solution A

| | |
|---|---:|
| Gelatin (extra pure product, produced by Wako Pure Chemical Industries, Ltd.) | 3 g |
| Colloidal silica (Snowtex C, 20% aqueous solution, produced by Nissan Chemical) | 20 g |
| Silica gel (Cylisia #310, produced by Fuji Cylisia Kagaku) | 7 g |
| Curing agent | 0.4 g |
| Distilled water | 100 g |

These were dispersed together with glass beads in a paint shaker for 10 minutes.

The obtained printed matter had a very clear image free of slipping or thinning of the printed image even after 10,000 sheets were continuously printed.

On the other hand, when wood-free paper was used as the printing paper sheet, the solid making was partially failed due to paper dust after 3,000 sheets were printed. Therefore, an air suction pump was disposed as a paper dust-preventing device in the vicinity of the paper feed part and then, printing was performed. As a result, printing failure was not generated and the printed matters obtained had a very clear image free of slipping or thinning even after 5,000 sheets were continuously printed. However, after printing of 5,000 sheets, an elongation of 0.1 mm was observed on the image of A3 size in the machine direction.

After the plate-making, the ink was recovered from the ink circulation line and the cleaning solution was again circulated therein as shown in FIG. 6, as a result, good printing plates could be manufactured without requiring any maintenance operation for 12 months.

Example 8

An operation was performed in the same manner as in Example 4 except that a plate material having provided on the surface thereof an image-receiving layer capable of hydrophilizing by a desensitization treatment, prepared in Example 3, was used in place of the aluminum plate of Example 4, the non-image area after the preparation of the printing plate was hydrophilized using a plate surface-desensitizing device, the electrically conducting layer of the plate material was earthed by the contact with an electrically conducting plate spring (made of phosphor bronze) at the time of drawing, and the fixing was performed by blowing hot air to the plate material.

The plate-making was performed by removing a cleaning solution at the initiation of the plate-making from the ink circulation line where the cleaning solution was circulated as shown in FIG. 2 according to the second embodiment of the present invention until the plate-making.

The printed matters obtained had a very clear image free of slipping or thinning of the printed image even after 5,000 sheets were continuously printed.

After the plate-making, the ink was recovered from the ink circulation line and the cleaning solution was again circulated therein as shown in FIG. 2, as a result, good printing plates could be manufactured without requiring any maintenance operation for 12 months.

According to the present invention, a large number of printed matters having a clear image can be printed. Furthermore, a printing plate having a high-quality image corresponding to the digital image data can be stably manufactured directly on a press and the lithographic printing can be performed inexpensively at a high speed.

In addition, attachments adhering to the ejection electrode or passages in the ink circulation line can be effectively removed, so that stable ejection performance can be attained over a long period of time.

While the invention has been described in detail and with reference to specific embodiments thereof, it will be apparent to one skilled in the art that various changes and modifications can be made therein without departing from the spirit and scope thereof.

What is claimed is:

1. A plate-making method comprising:
    forming an image directly on a plate material by an electrostatic ink jet method comprising ejecting an oil ink using an electrostatic field based on signals of image data; and
    fixing said image to manufacture a printing plate,
    wherein said method uses:
        (1) an ink circulation line having the following members a, b and c:
            a. an ink jet ejection head,
            b. an ink transportation line comprising an ink feed line for feeding said oil ink to said ink jet ejection head and an ink recovery line for recovering said oil ink from said ink jet ejection head, and
            c. an ink tank for storing said oil ink;
        (2) a cleaning solution feed line for feeding a cleaning solution to said ink transportation line; and
        (3) a cleaning solution recovery line comprising a waste solution tank, for recovering said cleaning solution from said ink transportation line and discharging said recovered cleaning solution to said waste solution tank, and
    wherein at the time of cleaning, said ink tank is separated from said ink transportation line, said cleaning solution feed line and said cleaning solution recovery line are connected to said ink transportation line, and said cleaning solution is transported to the ink transportation line to perform the cleaning.

2. The plate-making process according to claim 1, wherein said cleaning solution is circulated at the time of cleaning.

3. The plate-making method according to claim 1, wherein the flow rate of said cleaning solution at the time of cleaning is higher than the flow rate of ink at the time of drawing an image.

4. The plate-making method according to claim 1, wherein said oil ink comprises:
    a nonaqueous solvent having an electric resistivity of $10^9$ Ωcm or more and a dielectric constant of 3.5 or less; and
    resin particles dispersed in said nonaqueous solvent, said resin particles being solid and hydrophobic at least at room temperature.

5. A plate-making apparatus comprising:
    an image-forming unit which forms an image directly on a plate material; and
    an image-fixing unit which fixes the image formed by said image-forming unit to obtain a printing plate,
    wherein said image-forming unit comprises:
    an ink jet drawing device having an ink jet ejection head from which an oil ink is ejected using electrostatic field based on signals of image data,
        an ink circulation unit comprising:
            (1) said ink jet ejection head,
            (2) an ink transportation unit comprising an ink feed member which feeds said oil ink to said ink jet ejection head and an ink recovery member which recovers said oil ink from said ink jet ejection head, and
            (3) an ink tank for storing said oil ink, a cleaning solution feed member which feeds a cleaning solution to said ink transportation unit,
    a cleaning solution recovery member comprising a waste solution tank, which recovers said cleaning solution from said ink transportation unit and discharges said recovered cleaning solution to said waste solution tank,
    a feed side changeover member which separates said ink tank from said ink transportation unit and at the same time, connects said cleaning solution feed member to said ink transportation unit, and
    a recovery side changeover member which connects said cleaning solution recovery member to said ink transportation unit.

6. The plate-making apparatus according to claim 5, further comprising a circulation unit which circulates said cleaning solution at the time of cleaning.

7. The plate-making apparatus according to claim 5, further comprising a flow rate-changing member capable of increasing the flow rate of said cleaning solution at the time of cleaning higher than the flow rate of ink at the time of drawing an image.

8. The plate-making apparatus according to claim 5, wherein said oil ink comprises:
    a nonaqueous solvent having an electric resistivity of $10^9$ Ωcm or more and a dielectric constant of 3.5 or less; and
    resin particles dispersed in said nonaqueous solvent, said resin particles being solid and hydrophobic at least at room temperature.

9. The plate-making apparatus according to claim 5, wherein said image-fixing unit has a heating member comprising at least one of a heat roller and a lamp selected from an infrared lamp, a halogen lamp and a xenon flash lamp.

10. The plate-making apparatus according to claim 9, wherein said heating member is disposed or controlled to gradually elevate the temperature of said plate material at the time of fixing said image.

11. The plate-making apparatus according to claim 5, further comprising a drum which is rotatable and capable of mounting said plate material thereon, so that the drawing of an image can be performed while moving said plate material by the rotation of said drum.

12. The plate-making apparatus according to claim 11, wherein said ejection head comprises a single channel head or a multi-channel head and is movable in a direction parallel to an axis of said drum to perform sub-scanning.

13. The plate-making apparatus according to claim 5, further comprising at least one pair of capstan rollers capable of holding and running said plate material to perform sub-scanning.

14. The plate-making apparatus according to claim 13, wherein said ejection head comprises a single channel head or a multi-channel head and is movable in a direction orthogonal to the running direction of said plate material to perform main scanning.

15. The plate-making apparatus according to claim 11 or 13, wherein said ejection head comprises a full line head having almost the same length as the width of said plate material.

16. The plate-making apparatus according to claim 5, which comprises a dust-removing member which removes dusts present on the surface of said plate material at least one of before and during the drawing on said plate material.

17. The plate-making apparatus according to claim 5, wherein said ink jet drawing device has a stirring member which stirs the oil ink in said ink tank for storing said oil ink.

18. The plate-making apparatus according to claim 5, wherein said ink jet drawing device has an ink temperature-controlling member which controls the temperature of said oil ink in said ink tank for storing said oil ink.

19. The plate-making apparatus according to claim 5, wherein said ink jet drawing device has an ink concentration-controlling member which controls the concentration of said oil ink.

20. The plate-making apparatus according to claim 5, which comprises a cleaning member which cleans said ejection head.

21. A computer-to-cylinder lithographic ink jet printing process comprising:
mounting a plate material onto a plate cylinder;
forming an image directly on said plate material by an ink jet method comprising ejecting an oil ink using the electrostatic field based on signals of image data to manufacture a printing plate; and
performing lithographic printing using said printing plate,
wherein said process uses:
(1) an ink circulation line having the following members a, b and c:
a. an ink jet ejection head,
b. an ink transportation line comprising an ink feed line for feeding said oil ink to said ink jet ejection head and an ink recovery line for recovering said oil ink from said ink jet ejection head, and
c. an ink tank for storing said oil ink;
(2) a cleaning solution feed line for feeding a cleaning solution to said ink transportation line, said cleaning solution feed line comprising a cleaning solution tank for storing said cleaning solution;
(3) a cleaning solution recovery line for recovering said cleaning solution from said ink transportation line and for feeding said recovered cleaning solution back to said cleaning solution tank; and
(4) a polluted cleaning solution recovery line comprising a waste solution tank, for recovering a polluted cleaning solution from said cleaning solution recovery line and storing said recovered polluted cleaning solution in said waste solution tank, and
wherein at the time of cleaning, said ink tank is separated from said ink transportation line, said cleaning solution feed line and said cleaning solution recovery line are connected to said ink transportation line, and a cleaning solution is transported to the ink transportation line to perform the cleaning, and
wherein at the initial stage of said cleaning, said cleaning solution recovery line is connected to said polluted cleaning solution recovery line and is then separated therefrom after the lapse of a predetermined time.

22. The computer-to-cylinder lithographic ink jet printing process according to claim 21, wherein said cleaning solution is circulated at the time of cleaning.

23. The computer-to-cylinder lithographic ink jet printing process according to claim 21, wherein the flow rate of said cleaning solution at the time of cleaning is higher than the flow rate of ink at the time of drawing an image.

24. The computer-to-cylinder type lithographic ink jet printing process according to claim 21, wherein said oil ink comprises:
a nonaqueous solvent having an electric resistivity of $10^9$ $\Omega$cm or more and a dielectric constant of 3.5 or less; and
resin particles dispersed in said nonaqueous solvent, said resin particles being solid and hydrophobic at least at room temperature.

25. A computer-to-cylinder lithographic printing apparatus comprising:
a plate cylinder for mounting a plate material thereon;
an image-forming unit which forms an image directly on the plate material on said plate cylinder to manufacture a printing plate having formed thereon an image; and
a lithographic printing unit which performs lithographic printing using said printing plate,
wherein said image-forming unit comprises:
an ink jet drawing device having an ink jet ejection head from which an oil ink is ejected using an electrostatic field based on signals of image data,
an ink circulation unit comprising:
(1) said ink jet ejection head,
(2) an ink transportation unit comprising an ink feed member which feeds said oil ink to said ink jet ejection head and an ink recovery member which recovers said oil ink from said ink jet ejection head, and
(3) an ink tank for storing said oil ink, a cleaning solution feed member which feeds a cleaning solution to said ink transportation unit, said cleaning solution feed member comprising a cleaning solution tank for storing said cleaning solution,
a cleaning solution recovery member which recovers said cleaning solution from said ink transportation unit and feeds said recovered cleaning solution back to said cleaning solution tank,
a polluted cleaning solution recover member comprising a waste solution tank and being connected to said cleaning solution recovery member, which recovers a polluted cleaning solution from said cleaning solution recovery member and stores said recovered polluted cleaning solution in said waste solution tank, a feed side changeover member which separates said ink tank from said ink transportation unit and at the same time, connects said cleaning solution feed member to said ink transportation unit, a recovery side changeover member which connects said cleaning solution recovery member to said ink transportation unit, and a changeover member which divides said cleaning solution recovery member at the connection point with said polluted cleaning solution recovery member to form an upstream side cleaning solution recovery member and a down stream side cleaning solution recovery member, and which separates the downstream side cleaning solution recovery member and connects said polluted cleaning solution recovery member to said upstream side cleaning solution recovery member.

26. The computer-to-cylinder lithographic printing apparatus according to claim 25, which comprises a circulation unit which circulates said cleaning solution at the time of cleaning.

27. The computer-to-cylinder lithographic printing apparatus according to claim 25, which comprises a flow rate-changing member capable of increasing the flow rate of said cleaning solution at the time of cleaning higher than the flow rate of ink at the time of drawing an image.

28. The computer-to-cylinder printing apparatus according to claim 25, wherein said oil ink comprises:

a nonaqueous solvent having an electric resistivity of $10^9$ $\Omega$cm or more and a dielectric constant of 3.5 or less; and resin particles dispersed in said nonaqueous solvent, said resin particles being solid and hydrophobic at least at room temperature.

29. The computer-to-cylinder lithographic printing apparatus according to claim 25, wherein said image-forming unit has a fixing device for fixing said ink.

30. The computer-to-cylinder lithographic printing apparatus according to claim 25, wherein said image-forming unit has a plate material surface dust-removing member which removes dusts present on the surface of plate material at least one of before and during the drawing on said plate material.

31. The computer-to-cylinder lithographic printing apparatus according to claim 25, wherein said plate cylinder is rotatable so that the drawing of an image can be performed while moving said plate material by the rotation of said plate cylinder.

32. The computer-to-cylinder lithographic printing apparatus according to claim 31, wherein said ejection head comprises a single channel bead or a multi-channel head and is movable in a direction parallel to an axis of said plate cylinder to perform sub-scanning.

33. The computer-to-cylinder lithographic printing apparatus according to claim 31, wherein said ejection head comprises a full line head having almost the same length as the width of said plate cylinder.

34. The computer-to-cylinder lithographic printing apparatus according to claim 25, which further comprises an ink-stirring member in said ink tank.

35. The computer-to-cylinder lithographic printing apparatus according to claim 25, which further comprises an ink temperature-controlling member which controls the temperature of the oil ink in said ink tank.

36. The computer-to-cylinder lithographic printing apparatus according to claim 25, which further comprises an ink concentration-controlling member which controls the concentration of said ink.

37. The computer-to-cylinder lithographic printing apparatus according to claim 25, wherein said ink jet drawing device has an ejection head-retreating or approximating member which approximates said ejection head to said plate cylinder at the drawing on said plate material and retreats said ejection head from said plate cylinder except for the drawing on said plate material.

38. The computer-to-cylinder lithographic printing apparatus according to claim 25, wherein said image-forming unit has an ejection head-cleaning member which cleans said ejection head at least at the completion of plate-making.

39. The computer-to-cylinder lithographic printing apparatus according to claim 25, wherein said lithographic printing unit has a paper dust-removing member which removes paper dusts generated at the lithographic printing.

40. A plate-making method comprising:

forming an image directly on a plate material by an electrostatic ink jet method comprising ejecting an oil ink using an electrostatic field based on signals of image data; and fixing said image to manufacture a printing plate, wherein said method uses:

(1) an ink circulation line having the following members a, b and c:
  a. an ink jet ejection head,
  b. an ink transportation line comprising an ink feed line for feeding said oil ink to said ink jet ejection head and an ink recovery line for recovering said oil ink from said ink jet ejection head, and
  c. an ink tank for storing said oil ink;

(2) a cleaning solution feed line for feeding a cleaning solution to said ink transportation line, said cleaning solution feed line comprising a cleaning solution tank for storing said cleaning solution;

(3) a cleaning solution recovery line for recovering said cleaning solution from said ink transportation line and for feeding said recovered cleaning solution back to said cleaning solution tank; and (4) a polluted cleaning solution recovery line comprising a waste solution tank, for recovering a polluted cleaning solution from said cleaning solution recovery line and storing said recovered polluted cleaning solution in said waste solution tank, and wherein at the time of cleaning, said ink tank is separated from said ink transportation line, said cleaning solution feed line and said cleaning solution recovery line are connected to said ink transportation line, and a cleaning solution is transported to the ink transportation line to perform the cleaning, and wherein at the initial stage of said cleaning, said cleaning solution recovery line is connected to said polluted cleaning solution recovery line and is then separated therefrom after the lapse of a predetermined time.

41. A plate-making apparatus comprising:

an image-forming unit which forms an image directly on a plate material; and an image-fixing unit which fixes the image formed by said image-forming unit to obtain a printing plate, wherein said image-forming unit comprises:

an ink jet drawing device having an ink jet ejection head from which an oil ink is ejected using electrostatic field based on signals of image data, an ink circulation unit comprising:

(1) said ink jet ejection head, (2) an ink transportation unit comprising an ink feed member which feeds said oil ink to said ink jet ejection head and an ink recovery member which recovers said oil ink from said ink jet ejection head, and (3) an ink tank for storing said oil ink, a cleaning solution feed member which feeds a cleaning solution to said ink transportation unit, said cleaning solution feed member comprising a cleaning solution tank for storing said cleaning solution, a cleaning solution recovery member which recovers said cleaning solution from said ink transportation unit and feeds said recovered cleaning solution back to said cleaning solution tank, a polluted cleaning solution recover member comprising a waste solution tank and being connected to said cleaning solution recovery member, which recovers a polluted cleaning solution from said cleaning solution recovery member and stores said recovered polluted cleaning solution in said waste solution tank, a feed side changeover member which separates said ink tank from said ink transportation unit and at the same time, connects said cleaning solution feed member to said ink transportation unit, a recovery side changeover member which connects said cleaning solution recovery member to said ink transportation unit, and a changeover member which divides said cleaning solution recovery member at the connection point with said polluted cleaning solution recovery member to form an upstream side cleaning solution recovery member and a down stream side cleaning solution recovery member, and which separates the downstream side cleaning solution recovery member and connects said polluted cleaning solution recovery member to said upstream side cleaning solution recovery member.

42. A computer-to-cylinder lithographic ink jet printing process comprising:

mounting a plate material onto a plate cylinder;

forming an image directly on said plate material by an ink jet method comprising ejecting an oil ink using an electrostatic field based on signals of image data to manufacture a printing plate; and performing lithographic printing using said printing plate, wherein said process uses:

(1) an ink circulation line having the following members a, b and c:
 a. an ink jet ejection head,
 b. an ink transportation line comprising an ink feed line for feeding said oil ink to said ink jet ejection head and an ink recovery line for recovering said oil ink from said ink jet ejection head, and
 c. an ink tank for storing said oil ink;

(2) a cleaning solution feed line for feeding a cleaning solution to said ink transportation line; and (3) a cleaning solution recovery line comprising a waste solution tank, for recovering said cleaning solution from said ink transportation line and discharging said recovered cleaning solution to said waste solution tank, and wherein at the time of cleaning, said ink tank is separated from said ink transportation line, said cleaning solution feed line and said cleaning solution recovery line are connected to said ink transportation line, and said cleaning solution is transported to the ink transportation line to perform the cleaning.

43. A computer-to-cylinder lithographic printing apparatus comprising:

a plate cylinder for mounting a plate material thereon;

an image-forming unit which forms an image directly on the plate material on said plate cylinder to manufacture a printing plate having formed thereon an image; and a lithographic printing unit which performs lithographic printing using said printing plate, wherein said image-forming unit comprises:

an ink jet drawing device having an ink jet ejection head from which an oil ink is ejected using electrostatic field based on signals of image data, an ink circulation unit comprising:
(1) said ink jet ejection head,
(2) an ink transportation unit comprising an ink feed member which feeds said oil ink to said ink jet ejection head and an ink recovery member which recovers said oil ink from said ink jet ejection head, and
(3) an ink tank for storing said oil ink, a cleaning solution feed member which feeds a cleaning solution to said ink transportation unit, a cleaning solution recovery member comprising a waste solution tank, which recovers said cleaning solution from said ink transportation unit and discharges said recovered cleaning solution to said waste solution tank, a feed side changeover member which separates said ink tank from said ink transportation unit and at the same time, connects said cleaning solution feed member to said ink transportation unit, and a recovery side changeover member which connects said cleaning solution recovery member to said ink transportation unit.

* * * * *